Dec. 24, 1963 A. C. CORNER 3,115,553
AUTOMATIC TELEPHONE SYSTEMS
Filed May 2, 1960 13 Sheets-Sheet 1

INVENTOR
ARTHUR CHARLES CORNER
BY
Irvin S. Thompson
ATTORNEY

INVENTOR
ARTHUR CHARLES CORNER
BY
Irwin S. Thompson
ATTORNEY

INVENTOR
ARTHUR CHARLES CORNER
BY
Irvin S. Thompson
ATTORNEY

Dec. 24, 1963 A. C. CORNER 3,115,553

AUTOMATIC TELEPHONE SYSTEMS

Filed May 2, 1960 13 Sheets-Sheet 4

INVENTOR
ARTHUR CHARLES CORNER

BY
Irwin S. Thompson
ATTORNEY

INVENTOR
ARTHUR CHARLES CORNER
BY
Irwin S. Thompson
ATTORNEY

INVENTOR
ARTHUR CHARLES CORNER
BY
Irwin S. Thompson
ATTORNEY

INVENTOR
ARTHUR CHARLES CORNER
BY
Irwin S. Thompson
ATTORNEY

Dec. 24, 1963 A. C. CORNER 3,115,553

AUTOMATIC TELEPHONE SYSTEMS

Filed May 2, 1960 13 Sheets-Sheet 8

INVENTOR
ARTHUR CHARLES CORNER

BY Irwin S. Thompson

ATTORNEY

Dec. 24, 1963 | A. C. CORNER | 3,115,553

AUTOMATIC TELEPHONE SYSTEMS

Filed May 2, 1960 | 13 Sheets-Sheet 9

INVENTOR
ARTHUR CHARLES CORNER
BY
Irwin S. Thompson
ATTORNEY

Dec. 24, 1963

A. C. CORNER 3,115,553

AUTOMATIC TELEPHONE SYSTEMS

Filed May 2, 1960

13 Sheets-Sheet 10

INVENTOR
ARTHUR CHARLES CORNER
BY
Irwin S. Thompson
ATTORNEY

Dec. 24, 1963 A. C. CORNER 3,115,553

AUTOMATIC TELEPHONE SYSTEMS

Filed May 2, 1960 13 Sheets-Sheet 11

INVENTOR
ARTHUR CHARLES CORNER

BY
Irwin S. Thompson
ATTORNEY

INVENTOR
ARTHUR CHARLES CORNER
BY Irwin S. Thompson
ATTORNEY

INVENTOR
ARTHUR CHARLES CORNER
BY
Irwin S. Thompson
ATTORNEY

United States Patent Office 3,115,553
Patented Dec. 24, 1963

3,115,553

AUTOMATIC TELEPHONE SYSTEMS

Arthur Charles Corner, Liverpool, England, assignor to Automatic Telephone & Electric Company Limited, Liverpool, England, a British company Filed May 2, 1960, Ser. No. 26,297
Claims priority, application Great Britain May 9, 1959
6 Claims. (Cl. 179—22)

Figure 1:
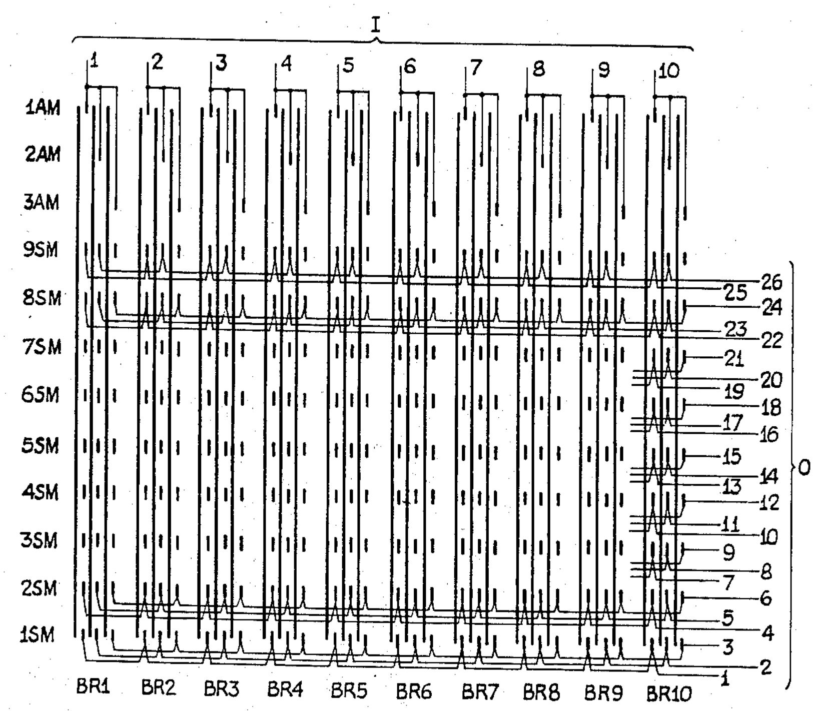
Figure 2:
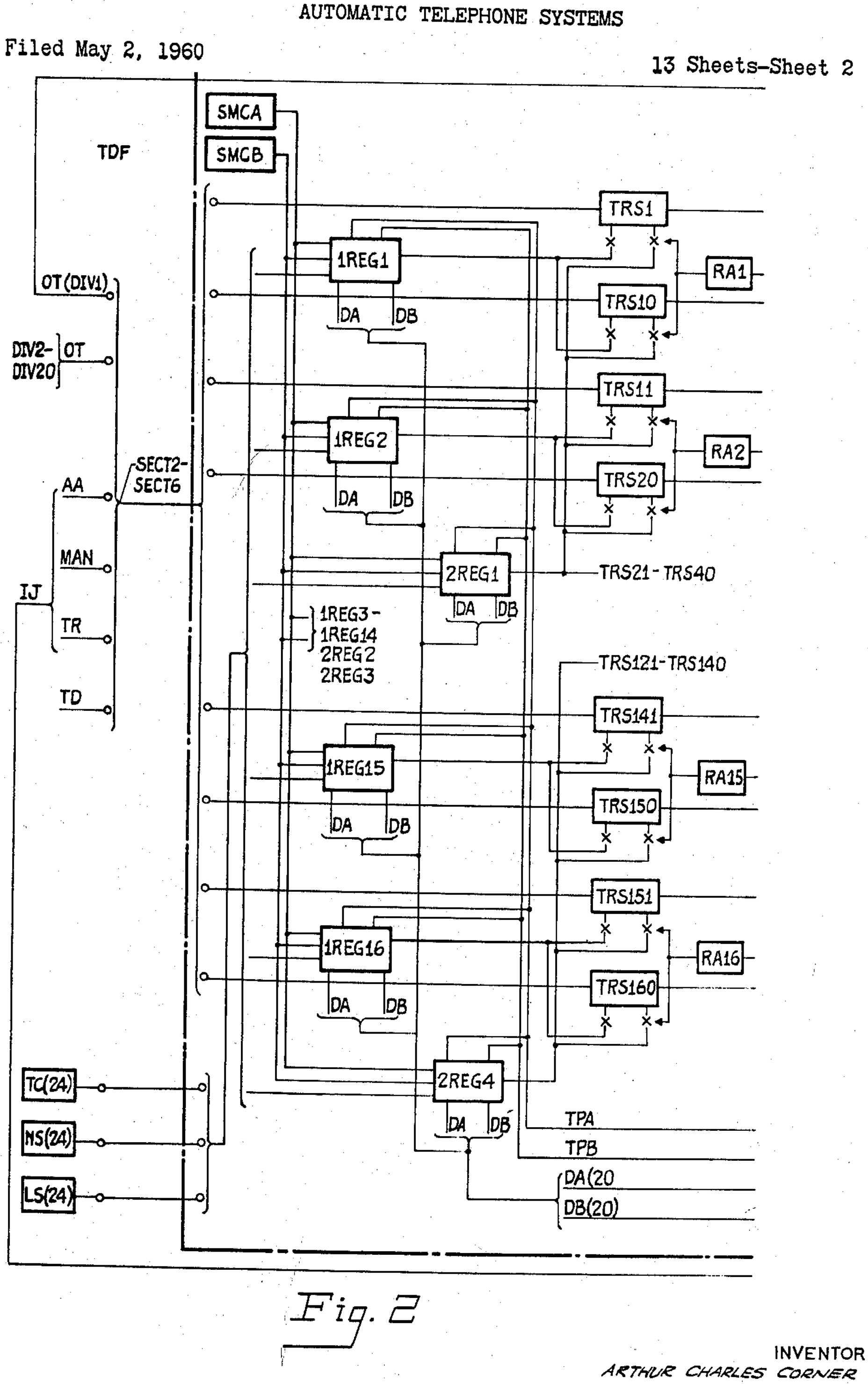
Figure 3:
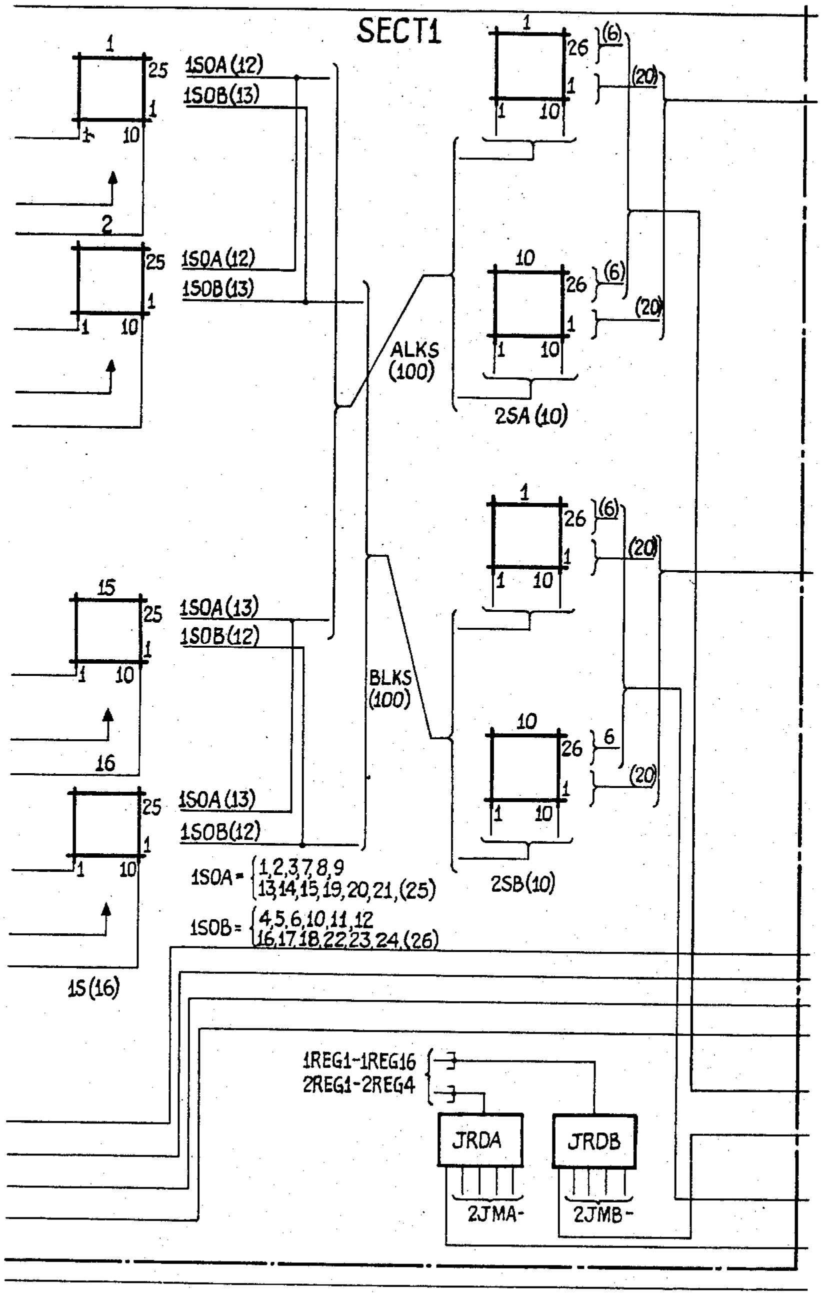
Figure 4:
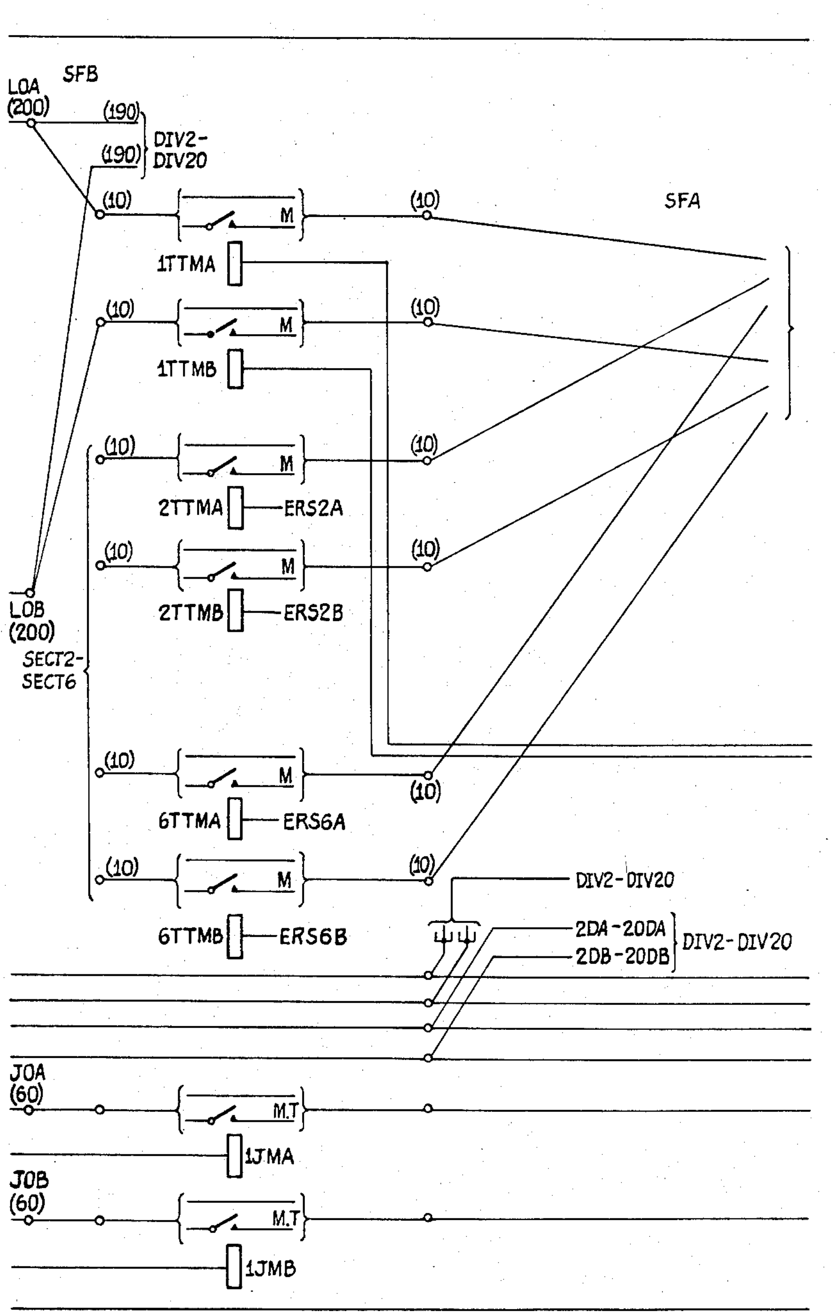
Figure 5:
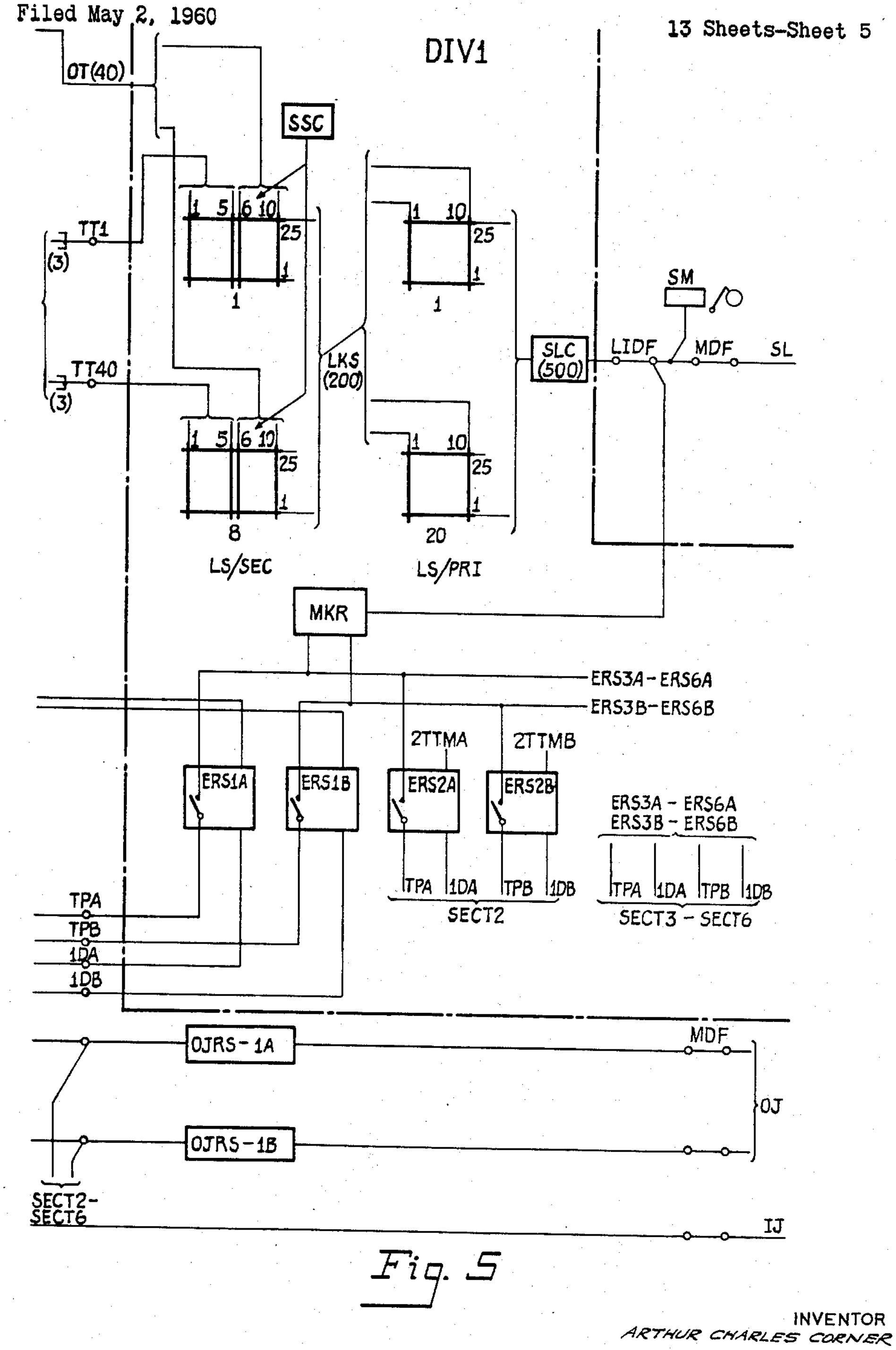

The present invention relates to improvements in automatic telephone systems and is more particularly concerned with automatic telephone systems using crossbar switches in the selecting stages.

For reasons of economy and efficiency, in telephone systems using crossbar switches in the selecting stages, the switches are usually arranged for a method of so-called link working, whereby each crossbar switch selector may be used for a plurality of conversational connections simultaneously. Generally, systems employing link working are of a relatively involved nature from the trunking aspect, and often incorporate highly-centralised and complex common control equipment which derives digital information from registers, and processes that information for use in the direct control of switching stages to effect the setting-up of conversational connections.

The invention particularly relates to a crossbar-type telephone system which operates on what is known as the self-steering principle. According to this principle crossbar switch stages comprising link-connected primary and secondary switches are employed and a connection is set up between an inlet to the primary switch of one stage and an outlet of a secondary switch of another stage by marking all the available paths extending over the switching stages between the inlet and the outlet, by selecting one of the marked paths and by operating the switches of the stages to complete the connection over to selected path. For this purpose the inlets to a switch are each connected to a bridge and the outlets are multipled to corresponding crosspoints in all the bridges. The outlets to a switch each include a marking conductor which is not multipled to the crosspoints but terminates on a select magnet and the switch includes a marking relay which is operated when any select magnet is operated. The operation of the marking relay serves to apply a marking potential to the marking leads of all the available inlets to the switch and hence to the outlets of switches in the adjacent rank. Therefore, when a marking potential is applied to the marking lead of an outlet of a switch, the select magnet associated with the marking lead operates followed by the marking relay and the marking potential is applied to all the available outlets of the switch. Usually three conductors are multipled at each crosspoint through the switch, two being speech conductors and the third being the P conductor. When one of the marked inlets has been selected, a potential is applied to the P conductor to operate the associated bridge magnet thereby completing the connection between the selected inlet and the calling outlet in the well known manner of a crossbar switch. Bridge magnet contacts which are operated when the bridge magnet is operated disconnect the marking conductor of the associated inlet and thereby prevent marking potential being applied to a busy inlet.

In a typical exchange operating on the self-steering system and having subscribers' lines terminated on the outlets of the primary switch of a line selector consisting of primary and secondary crossbar switches, the initiation of a connection by a subscriber causes all available paths between said primary switch and secondary switches link-connected thereto to be marked, the marking being extended to all the inlets of the secondary switch to which the marked and available links have access. The inlets of the secondary switch are connected to originating trunks and terminating trunks and the terminating trunks have access to speech path relay sets. On a call origination marking potential is applied only to inlets connected to originating trunks which also have access to available speech path relay sets. The secondary switch is provided with means for selecting one inlet and for operating the bridge magnet of the selected inlet by applying a potential to the P conductor. On the closure of the relevant crosspoint, the potential on the P conductor is extended to the outlet relevant to the operated select magnet and thence over the link to operate the appropriate bridge magnet of the primary switch to connect the calling subscriber's line to the selected speech path relay set.

A switching stage consisting of link-connected primary and secondary crossbar switches is provided between the speech path relay sets and the terminating trunks and the speech path relay sets have access to registers. The registers respond to dialled digits representing the called line and take into use one of a number of markers to which information designating the called line is transferred. The selected marker applies a marking potential to the called line circuit and if it is idle the marking is extended, in the manner described for the calling line, through the primary and secondary switches of the appropriate line selector to all available terminating trunks and thence over all available paths accessible to the available terminating trunks through the primary and secondary switches of the switching stage. The inlet to one particular primary switch of the switching stage has already been selected by the selecting of a speech path relay set and the bridge magnet relevant to this inlet is now operated and is followed by the operation of bridge magnets in the secondary switch of the switching stage and the primary and secondary switches of the line selector to complete the connection between the calling and called subscribers.

It will be understood that the above description gives onl ythe principles of operation in a self-steering system and that many features such as trunking details have been omitted. However, it is believed that sufficient has been said to enable the self-steering principle to be understood.

The main object of the present invention is to provide an improved self-steering system in which the number of connections which may be set up simultaneously may be increased.

A further object of the invention is to provide an improved crossbar selector switch for use in the self-steering system.

Another object of the invention is to provide a crossbar switch the internal trunking of which provide an increased number of outlets.

According to a feature of the invention groups of subscribers' line circuits are connected to different line selector divisions and each switching or trunking section is divided into two sub-sections by dividing the outlets of the primary switches into two groups and link-connecting the two groups of outlets to different secondary switches, each group of outlets providing routes to the terminating trunks of all the line selector divisions and the marking conductors of the routes including contacts of switching devices provided on the basis of one for each trunk sub-section for each line selector division whereby simultaneous connections can be set up over the same switching section provided the connections are not for subscribers in the same line selector division.

Another feature of the invention relates to a crossbar switch selector having first and second groups of select magnets, an inlet connected to each bridge and multipled to crosspoints controlled by the first group of select magnets, two groups of multi-conductor outlets each including a marking conductor and a plurality of conductors multipled to corresponding crosspoints of all the bridges, two discriminating relays, one for each group of outlets, one of the discriminating relays being operated when an inlet is taken into use, the operation of a discriminating relay extending the marking conductors of the corresponding group of outlets to the first group of select magnets, one only of which operates in response to marking potentials applied to any of said group of outlets, a switching device for each select magnet of the first group, the switching device operating when the corresponding select magnet operates and serving to extend the marking conductors of outlets relevant to the operated discriminating relay and the operated switching device to the appropriate select magnets of the second group to operate one only of the select magnets relevant to one of the outlets of the group, the operation of the bridge magnet relevant to the inlet taken into use serving to connect the one inlet to the one outlet.

A further feature of the invention relates to a crossbar switch having a first group of three select magnets and a second group consisting of the remaining select magnets, a plurality of inlets each connected to one bridge and each being multipled to the operative contact pile-ups of crosspoints controlled by said first group of select magnets and a plurality of outlets arranged in sets of three and a set of not more than two, the different sets of three outlets being connected to the contact pile-ups of the crosspoints controlled by all except one of the second group of select magnets while the set of two outlets is connected to the contact pile-ups of the crosspoints controlled by said one select magnet.

The invention will be better understood from the following description of the preferred method of carrying it into effect which should be read in conjunction with the accompanying drawings.

Figure 6:
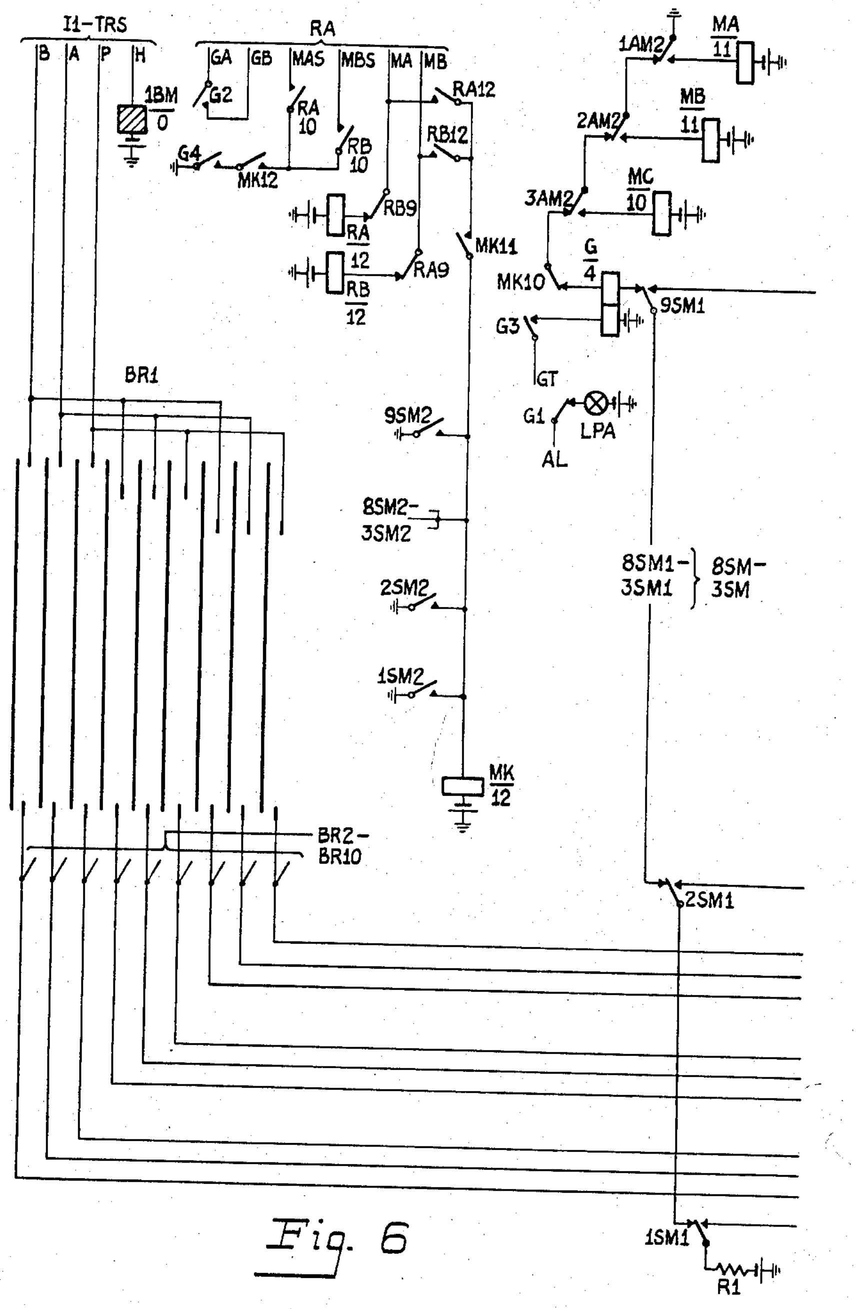
Figure 7:
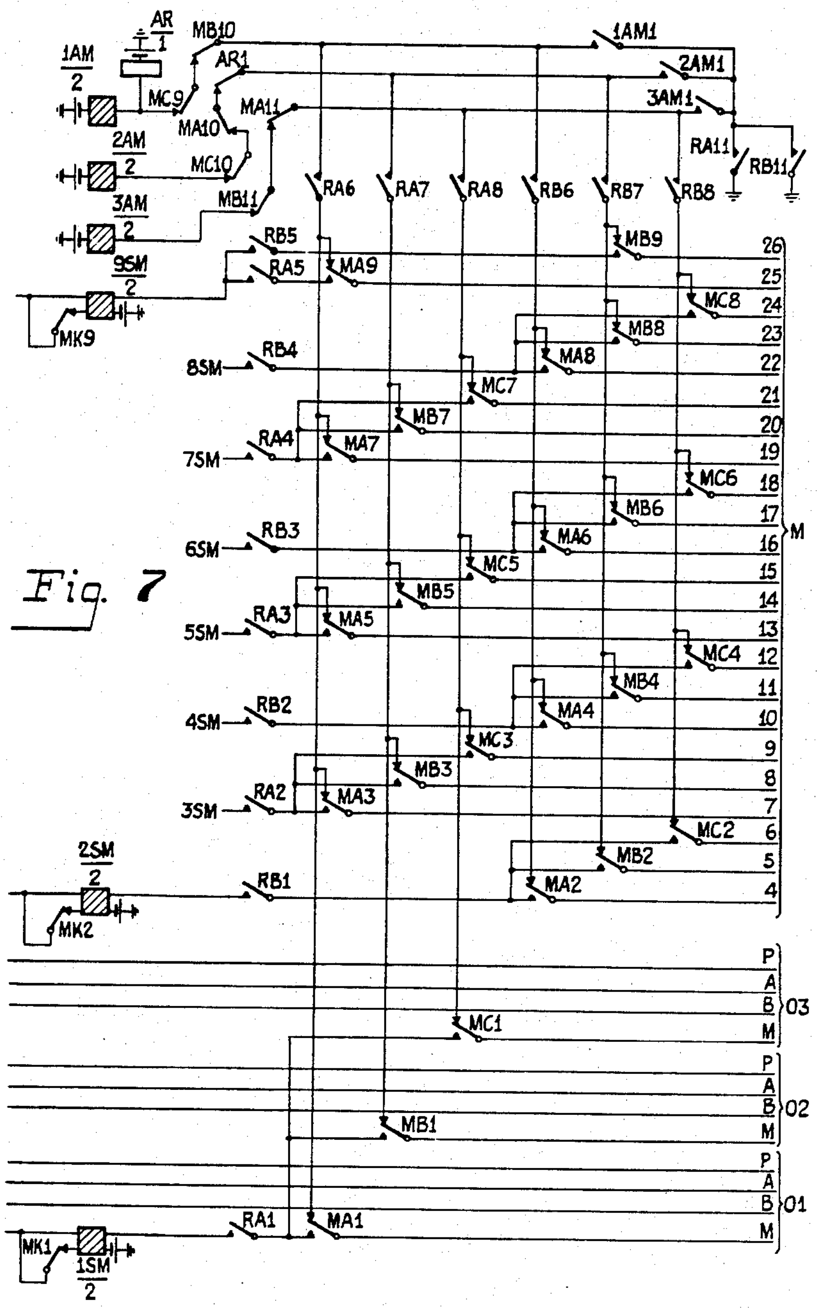
Figure 8:
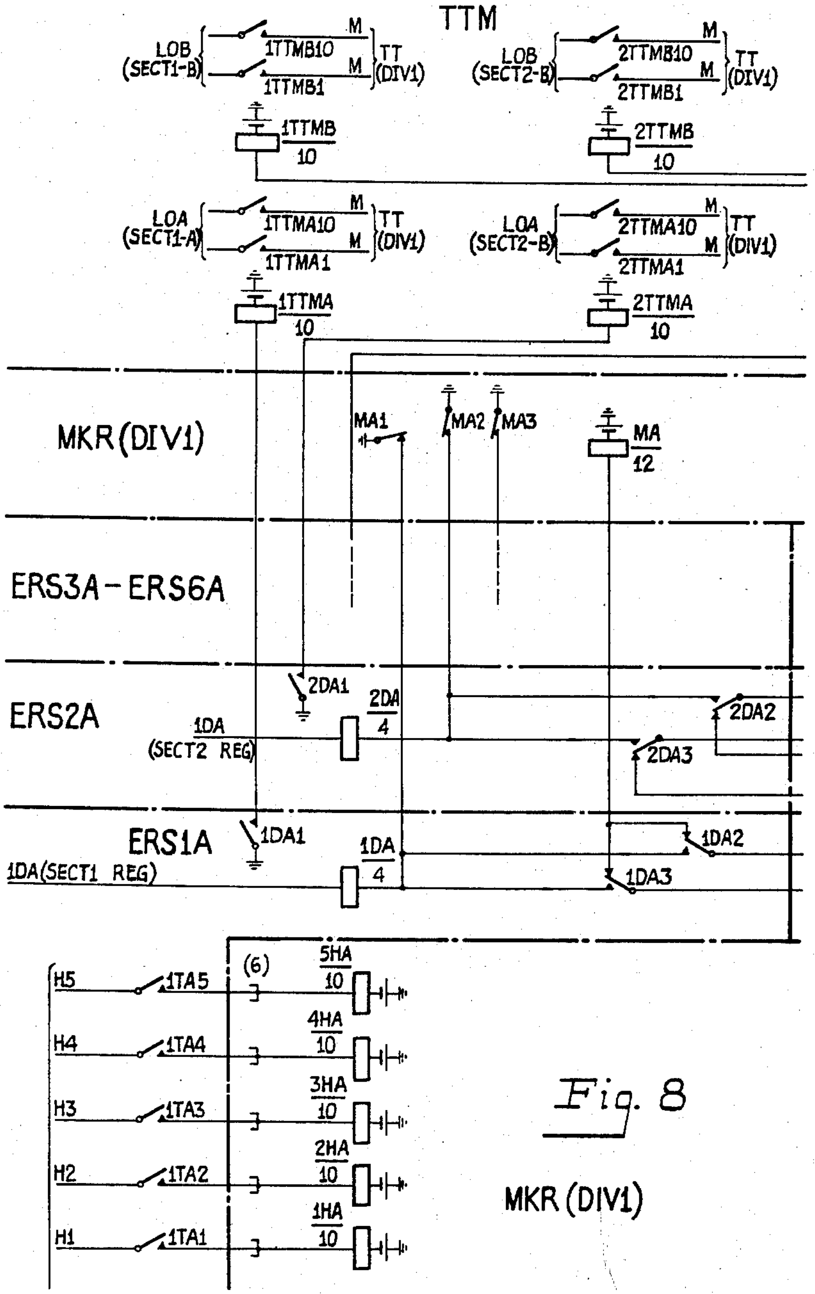
Figure 9:
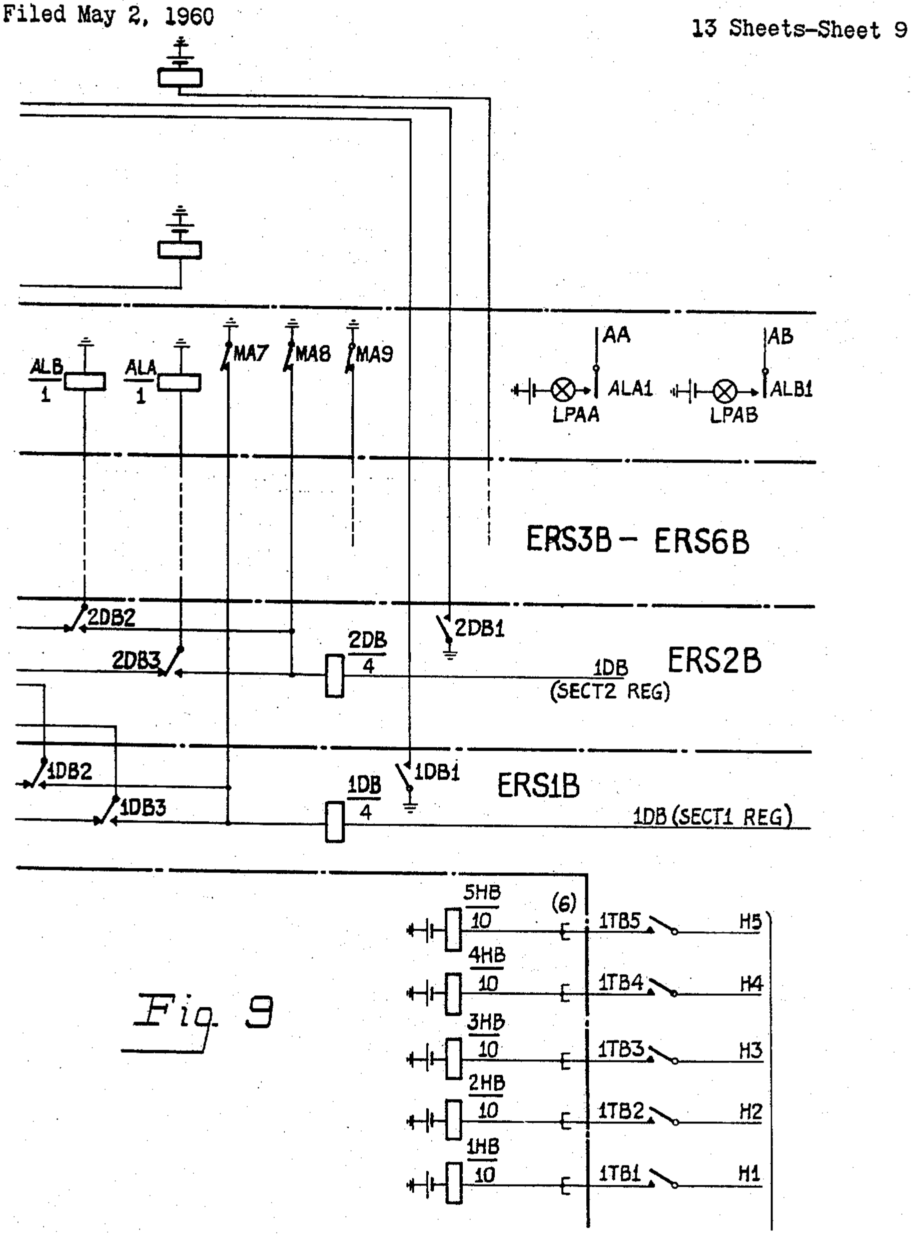
Figure 10:
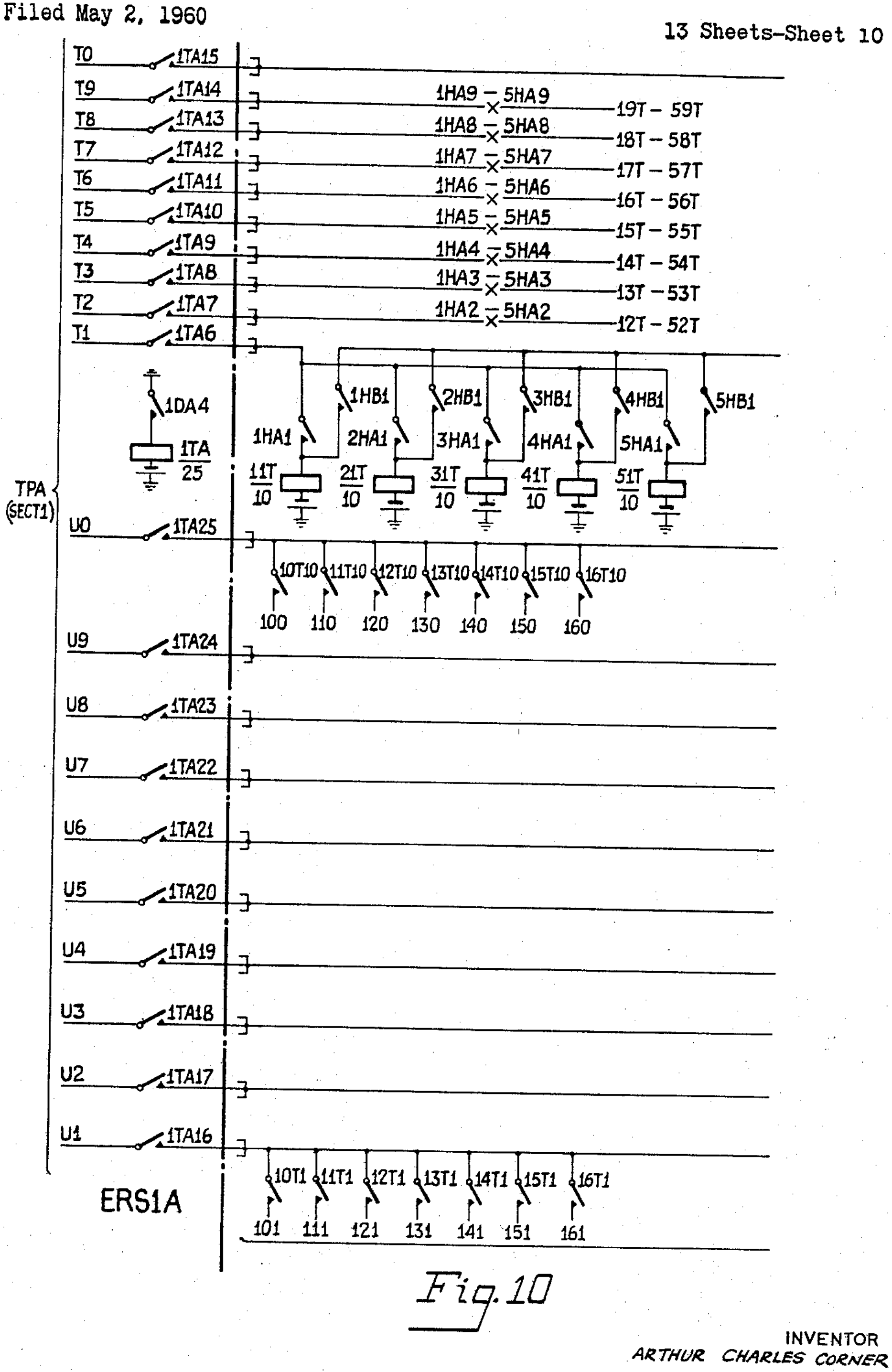
Figure 11:
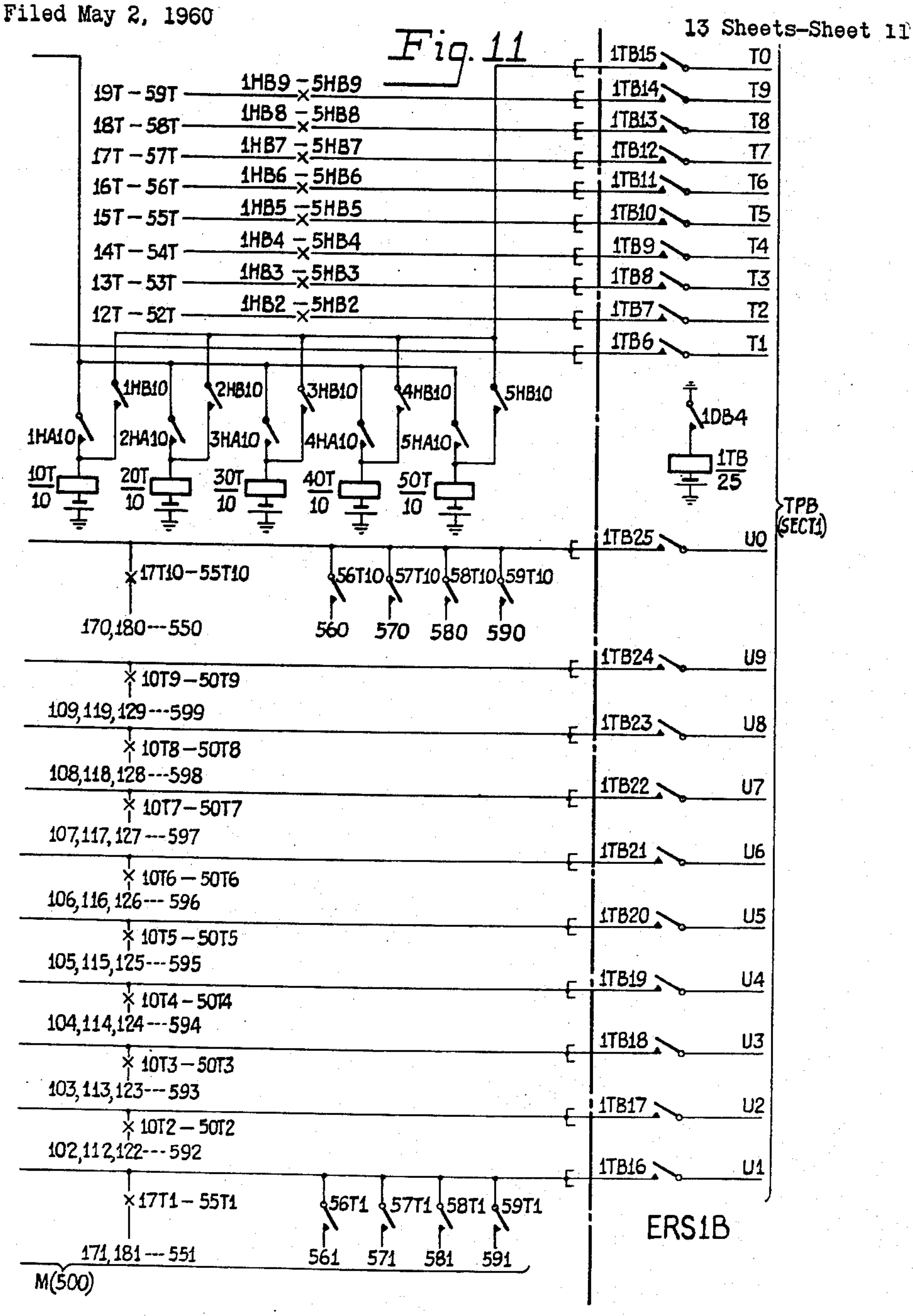
Figure 12:
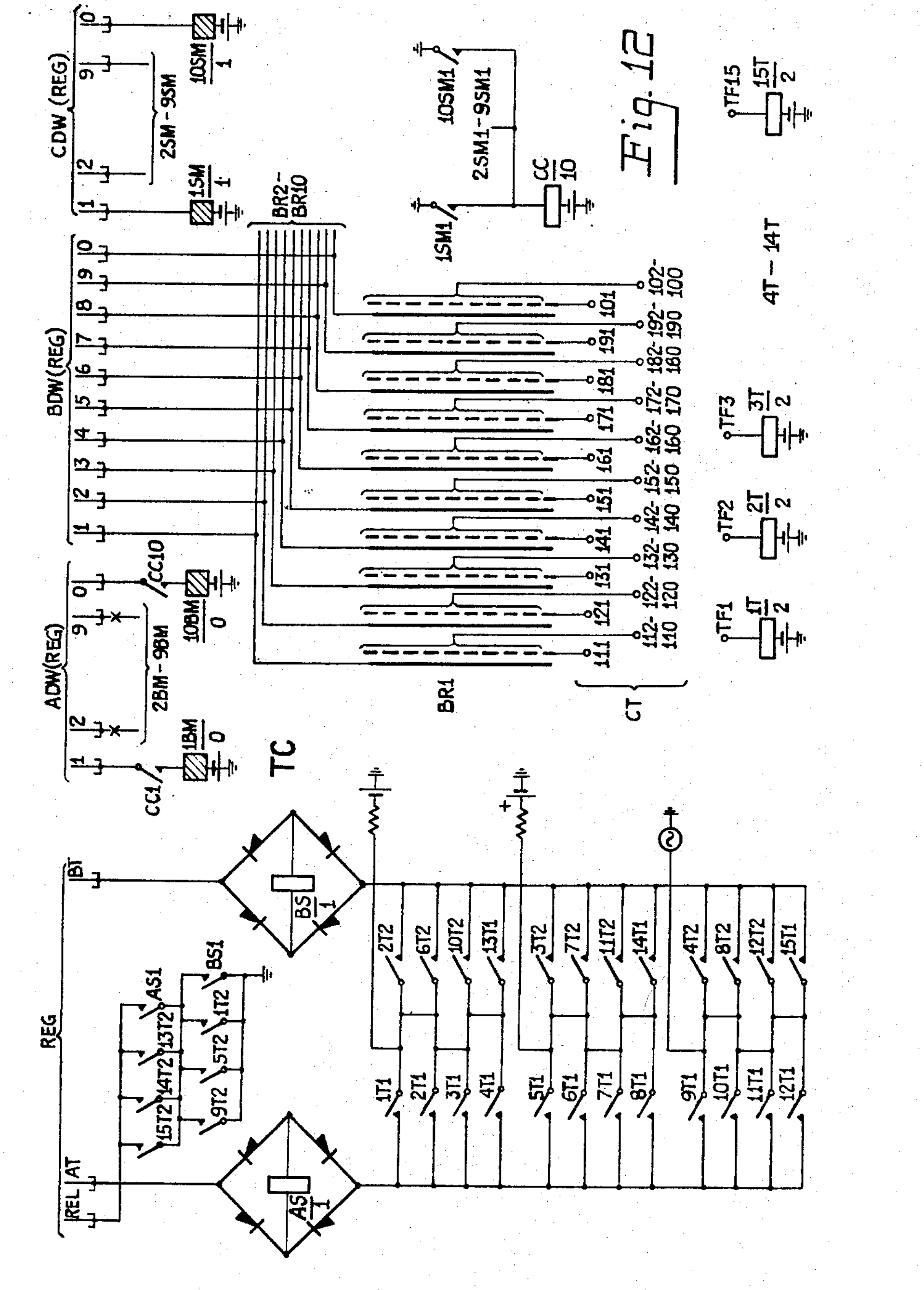
Figure 13:
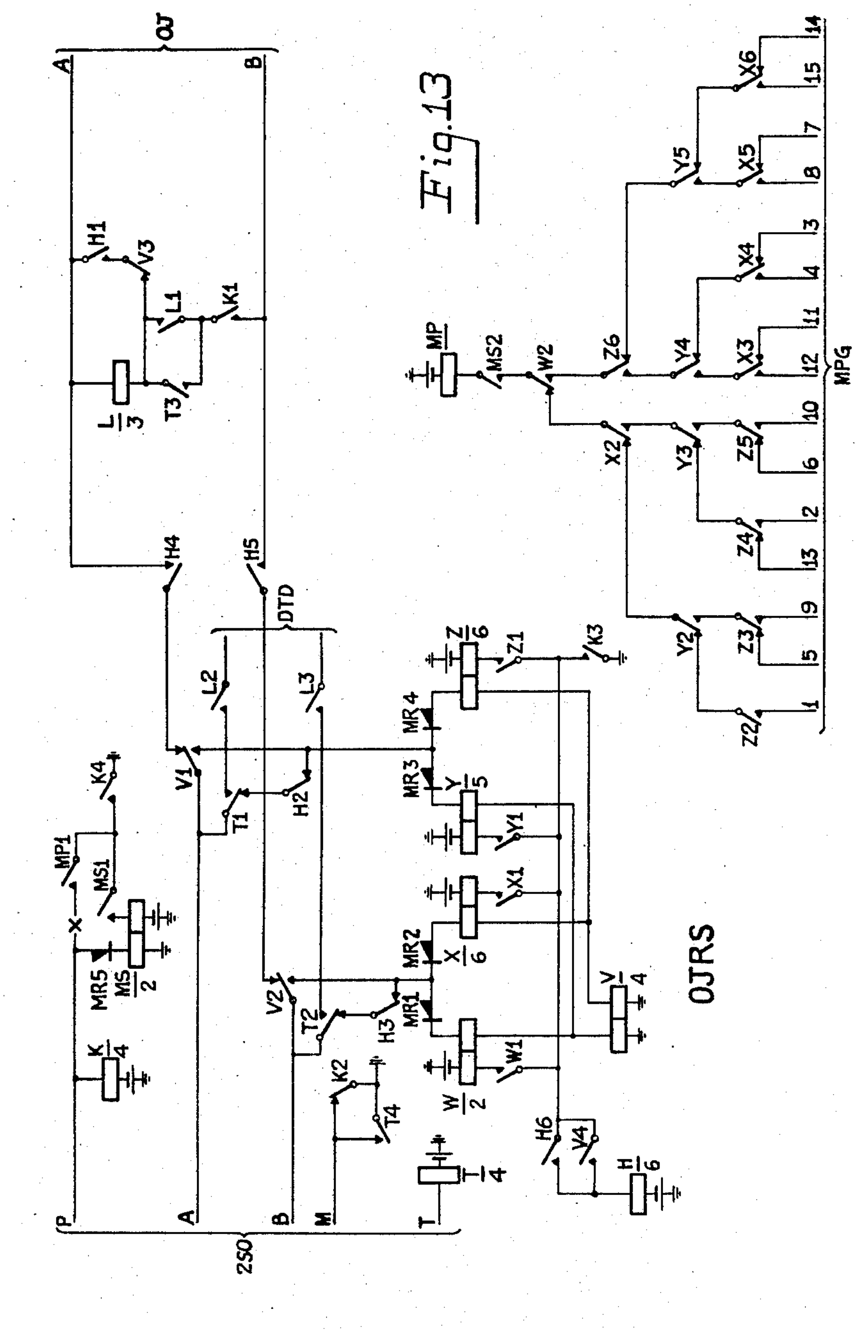

Of these drawings:

FIG. 1 shows in outline a crossbar switch arranged for triple-group working,

FIGS. 2 to 5, when placed side-by-side in that order, form a trunking diagram appertaining to a typical 10,000 line automatic telephone exchange according to the invention, FIGS. 6 and 7, arranged with FIG. 6 on the left, constitute the circuit of a first selector for use in the typical exchange, FIGS. 8, 9, 10 and 11, when arranged with FIGS. 8 and 9 above FIGS. 10 and 11 form the circuit of a marker, together with auxiliary devices, for 500 subscribers' line circuits served by one division of the typical exchange, and FIGS. 12 and 13 are the circuits of a tariff computer and outgoing junction relay set respectively.

*Crossbar Switches of the Selecting Stages*

In the automatic telephone exchange to be described, the selectors of the main selecting stages involve crossbar switches of the 12 x 10 type i.e. having twelve select magnets and ten bridge magnets. As illustrated in simplified form by FIG. 1, each switch is arranged for what may be termed triple-group working so that each of the ten inlets I1 to I10 has access to as many as 26 outlets, O1 to O26, individually. The ten bridges BR1 to BR10 are represented vertically, and the positions of references 1SM to 9SM are indicative of the effective positions of the nine select magnets with respect to the switch crosspoints which they control in each bridge, and likewise the references 1AM to 3AM, correspond to the effective positions of auxiliary select magnets with respect to other crosspoints in each bridge.

The mechanism of the switch is of the conventional type such as described in the Bell System Technical Journal, volume XVIII, pages 80 to 86. As described in this article an individual axially-pivoted select bar, carrying a selecting finger for each bridge, is associated with each pair of select magnets such as 1SM and 2SM, 3SM and 4SM . . . 9SM and 3AM, 2AM and 1AM as shown in FIG. 1. The operation of a select magnet swings the select bar in the appropriate direction whereby the fingers are so positioned, with respect to corresponding crosspoints in each bridge, as to enable one of said crosspoints to be actuated by subsequent operation of a bridge magnet. In this conventional type of switch mechanism the crosspoint remains operated under the control of the operated bridge magnet when the select magnet has been released.

In the simplified illustration, each bridge is represented by three bridge commons (long vertical lines), and cooperating contact points (short vertical lines) are shown for each of the select magnets 1SM to 9SM and auxiliary magnets 1AM to 3AM. Each of the select magnets 1SM to 8SM have three cooperating contact points, one for each bridge common, whereas select magnet 9SM has two cooperating contact points, the third being indicated in the drawing but not connected. Further the auxiliary magnets 1AM to 3AM each have only one cooperating contact point. Thus magnet 1AM has a contact point cooperating with the left bridge common of all the bridges, magnet 2AM has a contact point cooperating with the centre bridge common of all the bridges whereas magnet 3AM has a contact point cooperating with the right hand bridge common of all the bridges. It will be understood that using a conventional switch mechanism of the type previously mentioned, three cooperating contact points will be provided for select magnets 1AM to 3AM and 9SM and in using the switch for the present invention the contact points which are not required can either be left unwired or removed. The removal of these contact points is the only way in which the switch when used with the present invention could differ from the conventional mechanism.

From the simplified illustration of FIG. 1, it would appear that single conductor connections are effected by the switch. In fact, however, for the present type exchange, the path through a switch involves three conductors, namely A and B (speech) and P (private) conductors. Accordingly the bridges actually have nine bridge commons and a similar number of contact points are provided at each of the crosspoints associated with select magnets 1SM to 9SM, whereas three contact points are provided in each bridge for each of the auxiliary magnet crosspoints. It should be pointed out that each selector also includes a number of control relays, and that the inlets and outlets have one or more conductors other than those (A, B and P) which are capable of being connected through the switch.

The 26 outlets are multipled through all 10 bridges in the manner shown so that the outlets are associated with the crosspoints of select magnets 1SM to 9SM as follows:

| | | | | | | | | | |
|---|---|---|---|---|---|---|---|---|---|
| Outlets | 1<br>2<br>3 | 4<br>5<br>6 | 7<br>8<br>9 | 10<br>11<br>12 | 13<br>14<br>15 | 16<br>17<br>18 | 19<br>20<br>21 | 22<br>23<br>24 | 25<br>26<br>------ |
| Select Magnets | 1SM | 2SM | 3SM | 4SM | 5SM | 6SM | 7SM | 8SM | 9SM |

The ten inlets I1 to I10 are associated with bridges BR1 to BR10 respectively and are each connected to contact points relevant to crosspoints controlled by the auxiliary magnets 1AM to 3AM. It will thus be seen that the switch outlets are related by the bridge commons to the crosspoints of the various auxiliary magnets in the following manner:

| | | | |
|---|---|---|---|
| Outlets | 1, 4, 7, 10, 13, 16, 19, 22, 25. | 2, 5, 8, 11, 14, 17, 20, 23, 26. | 3, 6, 9, 12, 15, 18, 21, 24. |
| Auxiliary Magnets | 1AM | 2AM | 3AM |

To assist in an understanding of the arrangement of the switch, the method of establishing a connection between inlet I4 and outlet O10 will be outlined. Firstly auxiliary magnet 1AM and select magnet 4SM are operated and subsequently the bridge magnet of bridge BR4 is operated. The latter in conjunction with magnet 4SM connects outlets O10, O11 and O12 to the three groups of bridge commons in bridge BR4, whereas the same bridge magnet in conjunction with magnet 1AM connects inlet I4 to the particular group of bridge commons to which outlet O10 is connected. Thus it can be seen that the switching principle is such that a select magnet 1SM to 9SM, operated in conjunction with a bridge magnet, connects three outlets to three groups of commons of the particular bridge, whereas an auxiliary select magnet 1AM to 3AM, having enabled an auxiliary crosspoint in the same bridge to be operated, effects a selection whereby the inlet is connected to one of the three groups of commons and so to the particular outlet.

The switch would be controlled so that the auxiliary and select magnets are released immediately a connection has been set up, whereupon the connection is maintained solely by the operated bridge magnet. It will be appreciated that although the actual setting-up of connections through the switch must proceed on a one-at-a-time basis, each of the ten bridges may be occupied in respect of individual through-connections as the same time.

It will be observed that one group of contact points relevant to magnet 9SM in each bridge is not wired and may be omitted since it is not available for use. It is not possible to use these contact groups to provide a twenty-seventh outlet, because auxiliary magnet 3AM and select magnet 9SM control the same select bar, and consequently both magnets cannot be operatively effective at the same time.

The principle of triple-group working is not limited in application to an arrangement such as that shown in FIG. 1 where the outlets are multipled throughout the bridges. Indeed the particular switch could readily be arranged so that each inlet gives access to a different group of 26 outlets making a total capacity of 260 outlets.

*General Description of Exchange*

The exchange will be described with reference to the trunking digaram comprising FIGS. 2 to 5 and which relates to a 10,000 line exchange. It should be understood that the crossbar switches of the selecting stages are arranged to be controlled in accordance with the previously described self-steering system and in the drawings the crossbar switches are represented by rectangles of which the vertical lines represent the bridges to which the inlets of the switch are connected whereas the horizontal lines represent the horizontal multipling of the outlets across the bridges. Only the first and the last of the bridges and multiplings are shown in order not to confuse the drawing.

*The divisions.*—The exchange comprises twenty divisions each individually serving 500 subscribers. One such division, DIV1, is represented in the diagram and this involves a line-selector arrangement having twenty primary crossbar-switches selectors LS/PRI and eight secondary selectors LS/SEC, only the first and last switch of each set being represented for simplicity. Each of the switches is internally wired in accordance with FIG. 1 to provide ten inlets and 25 outlets, the 26th outlet not being used. Each switch has a group of control relays individually associated with it but for convenience they are not represented. The 500 subscribers' lines SL are connected over the main distribution frame MDF and line intermediate distribution frame LIDF to individual subscribers' line circuits SLC which are terminated in groups of 25 upon the outlets of the twenty primary selectors, so that each group is served by a particular selector. The 200 outlets of the eight line-selector secondary switches are individually connected to the corresponding number of primary selector inlets over 200 links LKS in such a manner that each secondary selector is connected to each primary selector by at least one link, and in some cases two links. The link working arrangement gives each group of 25 subscribers, accommodated by a primary selector, access over ten links to all eight secondary selectors.

As regards the inlets of the eight secondary selectors LS/SEC1 to LS/SEC8, the first five inlets (bridges BR1 to BR5) of all selectors are taken by way of 40 so-called terminating trunks TT1 to TT40 to a strapping field SFA, whereas the remaining 40 inlets of the secondary selectors (involving bridges BR6 to BR10) are taken over 40 originating trunks OT to the trunk distribution field TDF. The latter is common to the exchange, and accordingly the 40 originating trunks of each of the remaining divisons DIV2–DIV20 are also connected to it.

The terminating trunks are concerned with calls incoming to subscribers of the division whereas the originating trunks are used for calls originated by subscribers of the division. It will be noted that a start shift circuit SSC is associated with the different groups of secondary switch inlets relevant to originating trunks, the immediate effect of this circuit being to give some measure of equalisation in respect of the usage of the secondary switches of the division so that a corresponding effect may be obtained as regards the distribution of traffic to the so-called trunk sections of the exchange to be described later.

Each division of the exchange incorporates a 500-line marker such as MKR and an associated pair of entry relay sets ERS1A and ERS1B, ERS2A and ERS2B and so on for each of the trunk sections of the exchange. The 500 marking wires emanating from the marker are individually connected to corresponding conductors at the numerical side of the line intermediate distribution frame LIDF whence they are extended to individual line circuits.

*The trunk sections.*—The number of so-called trunk sections is determined by traffic requirements, and in the present case it may be assumed that six are provided, one of which, designated SECT1, is represented in the trunking diagram.

The sections, which incorporate first and second crossbar selectors, transmission relay sets, first and second choice registers and register-allotters, constitute the intermediate portion of the exchange from the point of view of switching, all the sections being accessible from and giving access to every 500-line division.

Considering the selecting stages of the typical section, one stage comprises sixteen first selectors 1S1 to 1S16, and the other stage involves two groups of ten second selectors, one embracing selectors 2SA1 to 2SA10, and the other embracing selectors 2SB1 to 2SB10. The first and second selectors each incorporate a crossbar switch together with its necessary control relays, the crossbar switch being arranged in the manner represented by FIG. 1. Again, although the switch is adapted for the through-switching of A, B and P wires, the inlets and outlets involve one or more other conductors for control purposes.

The ten inlets of all first and second selectors are available for use, and likewise all 26 outlets of each of the second selectors are available whereas only 25 outlets of the possible 26 are used in the case of first selectors.

The section has 160 transmission relay sets 1TRS1 to 1TRS160 which, like corresponding relay sets of other sections, have their calling sides connected by individual trunks to the trunk distribution frame TDF. The relay sets incorporate speaking battery feeding and called subscriber answering supervision arrangements and are equipped to control the transmission of ringing current to called subscribers' lines of the exchange, and to control the transmission of ringing tone, busy tone and N.U. (number unobtainable) tone to calling subscribers as required. Moreover another important function of the relay set is to extend positive-battery metering pulses over the calling side P wire for call fee purposes.

The 160 transmission relay sets of each trunk section are allocated as required for locally originated calls, for incoming junction calls of various kinds, and for service calls such as those from a test desk.

to 1REG16 and four second-choice registers 2REG1 to 2REG4. Each of the first-choice registers is accessible from a different group of ten transmission relay sets served by a particular first selector. Thus, for example, register 1REG1 is the first-choice register for transmission relay sets TRS1 to TRS10. The second-choice registers are each accessible from 40 different relay sets as follows:

| | | | | |
|---|---|---|---|---|
| 2nd choice registers | 2REG1 | 2REG2 | 2REG3 | S2REG4 |
| Transmission relay sets | TRS1–TRS40 | TRS41–TRS80 | TRS81–TRS120 | TR121–TRS1600 |

The transmission relay sets are arranged in groups of ten and each group is connected to the ten inlets of a particular first selector. Thus relay sets TRS1 to TRS10 are connected to inlets 1 to 10 respectively of selector 1S1, relay sets TRS11 to TRS20 are related to inlets 1 to 10 respectively of selector 1S2, and so on to relay sets TRS151 to TRS160 which are terminated upon inlets 1 to 10 of selector 1S16. Now the first selectors are arranged in pairs 1S1 and 1S2, 1S3 and 1S4 . . . 1S15 and 1S16, and the outlets of the selectors of each particular pair are multipled so that 25 outlets are derived from the two selectors together. These are divided into what may be called "A" outlets and "B" outlets and are designated 1SOA and 1SOB in the trunking diagram. It will be recalled that the selector crossbar switches cater for 26 outlets, but in the case of first selectors only 25 are used. More particularly if we consider the pairs of selectors as numbering 1 to 8 downwardly, outlet number 26 of the odd pairs and outlet number 25 of the even pairs are not used. Considering selectors 1S1 and 1S2, which are typical of the odd pairs, the twelve outlets 1, 2, 3, 7, 8, 9, 13, 14, 15, 19, 20 and 21 are multipled and constitute "A" outlets, whereas the thirteen outlets 4, 5, 6, 10, 11, 12, 16, 17, 18, 22, 23, 24 and 26 are also multipled together and constitute the "B" outlets. On the other hand as regards the even pairs of selectors, such as selectors 1S15 and 1S16, the multipled outlet number 25 makes an additional "A" outlet whereas the "B" outlets are reduced to twelve by the omission of outlet number 26.

It will be seen that 100 "A" outlets (1SOA) and 100 "B" outlets (1SOB) are derived from the rank of first selectors, the "A" outlets extending over links ALKS are terminated on the 100 inlets of the ten second selector 2SA, while the "B" outlets extend to the 100 inlets of the ten selectors 2SB. The distribution of the first selector outlets is such that each first selector, and therefore the relevant ten transmission relay sets, has access to every secondary over one link and in some case over two links.

The secondary selectors 2SA1 and 2SA10 provide outlets to a total of 260 trunks, and the selectors 2SB1 to 2SB10 have a similar outlet capacity. Of each of the outlet groups, 200 designated LOA and LOB are available for locally terminated calls and 60 designated JOA and JOB are available for outgoing junction calls. The individual transmission relay sets have access to all 520 secondary selector outlets.

The provision of "A" and "B" outlets at the first selectors, and the connection of those outlets over "A" and "B" links (ALKS and BLKS) respectively to different groups of second selectors each giving access to a different group of local (LOA or LOB) and outgoing junction (JOA or JOB) outlets, in effect divides the section into two sub-sections, and it may be convenient to refer to that embracing second selectors 2SA as sub-section A, and to that embracing second selectors 2SB as sub-section B. The particular sub-section to be used in the setting-up of a connection from a transmission relay set to a wanted local subscriber or to an outgoing junction, is determined by a discriminating condition applied to the first selector.

The section has sixteen first-choice registers 1REG1

There are sixteen register-allotters in the section, designated RA1 to RA16, and each is associated with ten transmission relay sets of a group and with the first selector serving the group, the principal function of the allotters being to control the access paths of the first and second choice registers. Typically register-allotter RA1 is concerned with the access paths to registers 1REG1 and 2REG1 from the ten transmission relay sets TRS1 to TRS10. The register-allotter is also concerned in the connection of the discriminating condition, previously mentioned, to a first selector to determine whether subsection "A" or "B" is to be used for a call.

The registers are arranged to store dialled digits in any convenient manner, and have access, as and when required on calls to other exchanges, to groups of local senders LS, national senders NS and tariff computers TC. All of these equipments (for instance 24 of each type) are accessible over multi-conductor paths by way of the trunk distribution frame TDF and may, if required, be common to the whole exchange.

The local and national senders may be arranged for exchange-code translation and would be adapted to transmit digits over outgoing junctions in accordance with the route involved. Thus in all probability the local senders, which are concerned with the setting-up of calls to other exchanges in the local multi-exchange network, would transmit conventional loop impulses at 10 i.p.s., whereas the national senders might well be arranged to select one of several modes of digital transmission, which may be for instance 10 or 50 i.p.s. loop impulsing or some form of coded voice-frequency transmission.

The tariff computers would be arranged to be taken into use individually on outgoing junction calls, whereupon the setting of a tariff computer by a register in accordance with the call route, determines which of a plurality of tariff signals is duly to be transmitted to the outgoing junction relay set used for the call.

The trunking section also includes two section marking control circuits SMCA and SMCB which are concerned with sub-sections A and B respectively. Both of these circuits are accessible from all registers of the section and when any register has received all the digits necessary for the completion of a call, either for local termination or outgoing, it in effect applies to both section marking control circuits for permission for the call to proceed. If neither of the control circuits are in use when a register institutes a demand, either one of them may be seized and give the necessary permission, whereas if either one of them is busy the other becomes operative, but if both are busy the register will wait until a control circuit becomes idle.

The granting of permission for a call to proceed by section marking control circuit SMCA decides that subsection "A" is to be used for the call, and likewise section marking control circuit SMCB determines that subsection "B" is to be used.

The registers of the typical section are able to control the 500-line marker of any division for the completion of calls destined for subscribers served by the exchange. Two multi-conductor digit-transfer paths, TPA and TPB, which are concerned with this function are commoned to all registers of the section, the first path being appropriate to calls to be routed over sub-section "A," and the second path is used for calls over sub-section "B." Each path comprises 25 conductors, five for "hundreds" digit indications, and ten each for "tens" and "units" digit indications. The two transfer paths of the section are directed to all twenty 500-line divisions DIV1 to DIV20, by way of the strapping field SFA. The pair of digit-transfer paths TPA and TPB from each of the six sections is terminated in each division, the latter being provided with a marker entry relay set (ERS1A, ERS1B . . . ERS6A, ERS6B) for each section.

Two other groups of conductors DA and DB (20 conductors each), also concerned with local calls using sub-sections "A" and "B" respectively, are commoned to all the registers of the section, these being one conductor of each group connected to each division. Thus of the twenty DA and DB conductors emerging from section SECT1, 1DA and 1DB extend to division DIV1 to control marker entry relay sets ERS1A and ERS1B respectively, whereas the pairs of conductors 2DA and 2DB . . . 20DA and 20DB are extended in a similar manner to control entry relay sets ERS1A and ERS1B, in divisions DIV2 to DIV20 respectively. The DA and DB conductors from the other sections, SECT2 to SECT6, are also connected to appropriate entry relay sets (ERS2A, ERS2B . . . ERS6A, ERS6B) in the 20 divisions.

It may be mentioned briefly that the marking of one of the twenty DA or DB conductors by a register, effectively chooses the 500-line group of wanted subscriber, i.e., the particular division, whereas the energisation of three conductors (hundred, ten and unit digits) of the relevant 25-conductor transfer path TPA or TPB defines an individual subscriber in the division.

It is important to note that if a sub-section "A" is to be involved in a call, one of the DA conductors and transfer path TPA are used for defining a called subscriber, but if a call is to utilise sub-section "B" a DB conductor and transfer path TPB will be employed. It will be shown that this arrangement enables the section to institute the marking of a subscriber's line circuit in each of any two divisions concurrently, and moreover setting-up of connections from those line circuits to the transmission relay sets concerned may also proceed and be completed concurrently over the separate sub-sections without mutual interference. However if the calls involve transmission relay sets terminated on inlets of the same first selector the calls would be completed consecutively.

The typical exchange illustrated in outline in the trunking diagram caters for outgoing junction calls, and for this purpose each section incorporates a pair of junction route discriminators such as JRDA and JRDB. The junctions OJ of each outgoing route are divided into two sub-groups which are preferably equal and one of which is accessible from transmission relay sets over sub-section "A" and the other over sub-section "B" of each section. Each pair of junction route discriminators of a section is accessible from all the registers of that section, and, in the typical section shown, discriminator JRDA is taken into use when a caller, having taken a transmission relay set into use, requires to be connected to one of the sub-group of junctions, of any route, served by sub-section "A," whereas discriminator JRDB is used for connections to one of any sub-group of junctions served by sub-section "B." Briefly if section marking control circuit SMCA is seized by a register, and the digital information stored by a register is indicative of an outgoing junction call, it is determined that discriminator JRDA is to be used. Likewise section marking control circuit SMCB would determine that discriminator JRDB would be used.

It may be mentioned that when a discriminator is taken into use on an outgoing junction call, it performs a selecting function in accordance with routing information, e.g. exchange code digits, passed to it by the register. This selecting function effects operation of a so-called junction marking relay relative to the sub-group of the required junction route. Thus discriminator JRDA may selectively operate one of a set of junction marking relays, 1JMA, 2JMA and the like, to establish the necessary connections (additional to the A, B and P wires which are permanently connected) between the outgoing junction relay sets, such as OJRS–1A, of a particular sub-group and the relevant ones of those second selector outlets of sub-section "A" and collectively designated JOA. Similarly discriminator JRDB would be used to selectively operate one of a second set of junction marking relays, 1JMB, 2JMB and so on, to complete additional connections between relay sets, such as OJRS–1B of the required second sub-group, and the relevant ones of second selector outlets JOB of sub-section "B."

Each section would have under its control, a number of pairs of junction marking relays corresponding to the number of junction routes, to permit any sub-group of junctions to be associated with any sub-section.

The operation of any junction marking relay by completing additional connections (marking and test wires) between junction relay sets of a sub-group and a particular sub-section, will in effect permit an idle one of those junction relay sets to be selected for use.

The splitting of each junction group into two sub-groups as outlined, will enable the setting-up of an independent connection to be initiated to a junction relay set of each sub-group simultaneously by way of partner sub-sections or complementary sub-sections in different sections. The only exception is when the calls involve transmission relay sets served by the same first selector, in which case the junction connections are set-up successively.

*Originating trunks.*—As already mentioned each subscribers' division has 40 originating trunks which enable a subscriber to be connected to a transmission relay set in any section when he originates a call. The 40 originating trunks of each division are terminated upon a trunk distribution frame TDF, and each group of 40 is distributed as equally as possible, by jumpering, to all the sections. Thus in the present exchange, the 40 originating trunks of division DIV1 might well be distributed over the sections as follows:

| | | | | | | |
|---|---|---|---|---|---|---|
| No. of trunks | 7 | 7 | 7 | 7 | 6 | 6 |
| Section | SECT1 | SECT2 | SECT3 | SECT4 | SECT5 | SECT6 |

It would also be preferable to have the individual trunks of each of the groups accessible from different secondary selectors of the division. Since the five originating trunk inlets of each secondary selector (bridges 6 to 10) are arranged for a particular order of choice, it may also be advantageous to have the individual trunks of a group dispersed over a range of choices of inlets.

Considering the 160 transmission relay sets in each section, of the order 120 may for instance be allocated for use on locally originated calls and these are connected to individual originating trunks from all divisions. Taking the group of 6 or 7 trunks extending from a particular division into a section, these would preferably be spread over a corresponding number of transmission relay sets in such a manner as to make the maximum number of first choice and second choice registers available to them. Certainly the originating trunks of a group would be connected to transmission relay sets served by different first selectors and first choice registers.

The exchange would cater for incoming calls over junctions IJ from various types of exchanges. Accordingly groups of incoming junctions from automatic, manual and trunk exchanges, and respectively designated AA, MAN and TR, are connected to the trunk distribution frame TDF for distribution to transmission relay sets in appropriate sections. If required one or more trunk sections may be used exclusively for incoming junction calls. Trunks TD from the test desk are also connected to transmission relay sets by way of trunk distribution frame.

*Terminating trunks.*—It will be recalled that each section has 520 second-selector outlets and of these 400 are to give access to terminating trunks of all twenty divisions for the purpose of completing calls to subscribers of the exchange. Of the second-selector local outlets, 200 collectively designated LOA and 200 designated LOB are obtained from sub-sections "A" and "B" respectively. Ten LOA and ten LOB outlets from each of the six sections SECT1 to SECT6, making a total of 120 and extending over strapping fields SFB and SFA are connected to the 40 terminating trunks TT1 to TT40 of the typical division, so that each terminating trunk is connected to three second-selector outlets.

The links between second-selector outlets and terminating trunks embrace four conductors of which three, namely, —, + and P conductors, are continuous whereas the fourth, which is a marking wire M, is normally broken by a "make" contact of a terminating trunk marking relay 1TTMA, 1TTMB . . . 6TTMA, 6TTMB. Each such marking relay has ten contacts one of which is shown for simplicity, and the prefix digit of the relay designation is indicative of the section to which it is related whereas the suffix letter A or B is indicative of the relevant sub-section. Thus the ten contacts of relay 1TTMA, when operated, would complete the marking paths of the ten links between sub-section "A" of section SECT1 and ten terminating trunks of division DIV1, and likewise relay 1TTMB is concerned with the completion of the marking paths of the ten links between sub-section "B" of section SECT1 and the same division. The remaining five pairs of relays are related to other sections and the same division in a similar manner.

It will be appreciated that a group of six pairs of terminating trunk relays, such as those represented in the drawings, are provided for each 500-line division. Each of the twelve marker entry relay sets ERS1A to ERS6B of a division is arranged to control the operation of an individual terminating trunk marking relay. Thus for example, if a caller, who has taken into use a transmission relay set in section SECT1, requires connection to a subscriber served by division DIV1, and it has been established that the connection is to be completed over sub-section "A," relay set ERS1A is used to gain access to the divisional marker, and that relay set determines that relay 1TTMA shall operate. Since only one entry relay set of the particular division can be operative at any one time, it follows that only one terminating trunk marking relay relevant to that division can be operated, relay 1TTMA being operated in the present case. Therefore the marking (M) paths of the links between the calling subsection and the required division are completed, and the effect of this is to enable a connection to be set-up between the calling transmission relay set and the wanted subscriber over an idle one of the available links.

The provision of pairs of terminating trunk relays between each trunking section and each 500-line division effectively completes the separation of each section into its two sub-sections. As a result of this it becomes more evident that it will be possible for each section to handle the setting-up of two calls to subscribers in different divisions simultaneously. It will also be appreciated that, as regards a particular section, one sub-section may be used for the process of setting-up of a connection to an outgoing junction relay set while the other is being used for setting up a connection to a local subscriber over a division. In both cases there is again the proviso that the two calls must not involve transmission relay sets served by the same first selector.

*Exchange Subscriber Originates a Call*

The process of connecting a subscriber to a transmission relay set and register is in many respects substantially the same as was described in British specification No. 739,905 and will now be outlined with reference to the trunking diagram comprising FIGS. 2 to 5.

As already mentioned the 500 subscribers' line circuits SLC of a division are terminated upon individual outlets of the 20 primary line-selector LS/PRI. When a subscriber originates a call, the loop applied to his line SL operates the line relay of the relevant line circuit in conventional manner. The effect of this is to operate within the particular primary switch, a discriminating relay to signify that a call origination, as distinct from an incoming call, is to be dealt with and accordingly an originating call indication is connected to the discriminating lead of the ten links terminated on the primary switch. It should be mentioned that each link comprises five conductors viz: A, B, P, D (discriminating) and M (marking). The discriminating relay is also effective in causing the start shift circuit SSC, associated with all the secondary line-selectors LS/SEC of the division, to prepare for the testing of the 40 originating trunks of the division in successive groups of five from a pre-allotted point. The operation of the subscriber's line relay also results in the operation of the auxiliary and select magnets appropriate to the primary line-selector outlet serving the calling subscriber, and moreover causes said selector to apply a marking potential to those M wires of the ten links which are not already occupied on calls. The operated primary line-selector bridge magnets related to busy links would prevent marking of busy links. At this juncture, the primary selector is adapted to prevent the operation of its other select and/or auxiliary magnets if another of its subscribers should originate a call or be called, and additionally the calling subscriber is guarded against intrusion from the 500-line marker (incoming calls) by a guarding earth which is extended by way of the line circuit to the relevant incoming marking conductor.

Now the ten links, emerging from the primary selector concerned in the present call, are distributed over all the secondary selectors, so that six of the secondary selectors are each connected to the primary by a single link whereas the remaining two secondary selectors each have two links to the primary. As already mentioned the idle links are defined by a potential applied to the relevant marking (M) leads. Taking any secondary selector which has one link marked, the marking is effective in operating the appropriate auxiliary magnet and this enables (*a*) an originating-call discriminating relay to be operated by the significant potential received over the discriminating conductor of the link and (*b*) the select magnet appropriate to the link to be operated from the potential on the M wire. It may be mentioned that the circuit arrangements of the secondary selectors are such that if more than one link to the same selector are marked, one of them is given priority in that the auxiliary and select magnets appropriate to it alone are operated. Therefore a single auxiliary magnet and a select magnet are operated in each of the marked secondary selectors.

The five inlets (6 to 10) relevant to originating trunks, of each of the secondary switches of the division would be provided with individual testing relays for the purpose of detecting originating trunks associated with idle transmission relay sets having idle registers (first-choice registers initially) available to them. The group of five testing relays in each secondary selector are arranged for a particular order-of-choice as regards their operation and if two encounter suitable transmission relay sets, the choice corresponds to the number order of the inlets. The eight groups, comprising the testing relays of all the secondary selectors of the division are arranged so that, if need be, those included in marked secondary selectors may be brought into a testing condition group-by-group until all of them are so conditioned. For this purpose the groups are in effect formed into a one-way closed chain, and, for traffic distribution purposes, a different start lead from the previously-mentioned start shift circuit is introduced at the commencement of each group. The start shift circuit is virtually an eight-way cyclic distributor which advances one "step" each time any line selector primary switch is taken into use, and thereupon applies a starting condition to the appropriate point in said closed chain. This would cause the earliest succeeding group of testing relays appropriate to a marked secondary line-selector to proceed with testing of transmission relay sets. If all of the latter are busy and/or have no first-choice registers available for use, than after a few milli-seconds delay, the group of testing relays of the next marked selector begin testing. This procedure would be repeated until an idle and suitable transmission relay set is encountered, or, if no such relay set is encountered, until all the testing relays of the marked secondary selectors are in the testing condition.

Assuming that an idle transmission relay set having access to an idle first-choice register is encountered, the appropriate testing relay is operated by an idle-marking condition extending from the register by way of said relay set. The operated testing relay stops any further testing, guards the relay set and register against intrusion and operates the bridge magnet corresponding to the secondary switch inlet concerned. The seized transmission relay set is now associated exclusively with the first-choice register.

It is to be noted that when a first-choice register has been taken into use by a calling transmission relay set, the appropriate second-choice register, if idle, will be made available to the remaining idle ones of the same group of ten relay sets by the associated register-allotter. Thus in the course of a testing cycle such as that described, idle transmission relay sets with idle second-choice registers may be encountered by testing relays of the secondary line-selectors. However the condition produced by second-choice registers and initially encountered by the relevant testing relays is different to the idle marking condition produced by first-choice registers, and does not effect operation of the testing relay. Accordingly the testing cycle continues with the object of seizing the first available transmission relay set with an idle first-choice register.

Meanwhile any testing relay upon being extended to an idle second-choice register, although remaining inoperative itself, initiates operation of a relay having an operate lag which is a few milli-seconds in excess of the period required to perform the aforesaid testing cycle. If this cycle is completed without an idle transmission relay set and first-choice register being encountered, the operation of one of said slow-to-operate relays in a second-choice register will mature, whereupon the potential on the test conductor is made suitable for the operation of the relevant testing relay in a secondary selector. This would disable all other testing relays, guard the relay set and register against intrusion, and operate the bridge magnet of the appropriate second selector inlet.

It is now evident that when a subscriber originates a call, he causes all idle secondary switches to be marked and taken into use for the purpose of obtaining a transmission relay set and register over one of the 40 originating trunks OT which give access to all sections SECT1 to SECT6. When a suitable relay set and register have been selected by the exclusive operation of a testing relay in one of the secondary line-selectors, the operation of the relevant bridge magnet in the secondary line-selector performs the following main functions; (*a*) enables the transmission relay set to extend additional conductors, A, B, H (holding) and P, of the originating trunk to the register, and (*b*) in conjunction with select and auxiliary magnets appropriate to the marked outlet of the secondary line-selector closes those crosspoints which now connect the A, B and P wires of the defined originating trunk to said outlet and thence over the link to the appropriate inlet of the calling primary line-selector.

At this juncture the testing relay in the secondary line-selector is released, the transmission relay set and register are busied-out, and the bridge magnet is held from the register until such time as this function is eventually taken over by the transmission relay set, as it would be when the register is duly released. Also at this time, in the register, a circuit element, which is to be concerned with (*a*) testing the continuity of the speech path which is to be set up to the calling line circuit and (*b*) determining the class-of-service to be accorded to the caller, is connected to the A and B conductors.

Now that the A, B and P conductors of the particular originating trunk have been connected over a link to the inlet of the calling primary selector, the potential advanced over the P conductor enables the bridge magnet relevant to the inlet to operate. Thereupon the bridge magnet, in conjunction with the operated auxiliary and select magnet defining the calling line circuit actuates crosspoints in the primary selector to connect the A, B and P conductors of the link to said subscriber's line circuit.

At this stage the register, for a short period, tests for the continuity of A and B conductors to the subscriber's line circuit, and, if the speech-path conductors are in order, determines, in accordance with potentials provided by the line circuit, which class-of-service is to be accorded to the caller. Moreover the register effects operation of the conventional cut-off relay in the line circuit by way of one of the speech conductors, and this releases the line relay and completes the connection to the subscriber's loop. The cut-off relay is then held from the same source as the operated bridge magnets, and when the line relay releases, all the select and auxiliary magnets, which were operated by the present call origination, are released and moreover the relays in the various selectors revert to their normal conditions in readiness for other calls. The connection between the subscriber's line circuit and the transmission relay set and register is held by the calling subscriber's loop, the relevant bridge magnet in the primary and secondary line selectors, together with the line circuit cut-off relay, remaining operated from the register for the time being. In the meantime the dialled-impulses-accepting relay in the register is connected to the A and B conductors and dial tone is made audible to the caller by the register.

*Call to Local Exchange Subscriber*

It will be assumed that a local subscriber, having initiated a call, has taken into use a transmission relay set and register, say TRS10 and 1REG1 respectively, in section SECT1 of the exchange, and requires a subscriber served by division DIV1. The caller, upon hearing dial tone transmitted by the register, proceeds to dial the digits defining the wanted party. The digits are stored by the register, and when all of them have been received, the register takes either one of the section marking control circuits, SMCA and SMCB, into use arbitrarily. The control circuit so taken into use thereupon grants permission for the procedure of marking the called subscriber's line circuit to commence. Control circuit SMCA would determine that sub-section "A" (involving second selectors 2SA1 to 2SA10) be employed, whereas control circuit SMCB would determine that sub-section "B" (involving second selectors 2SB1 to 2SB10) be utilised.

Assuming that section marking control circuit SMCA is concerned in the present call, the register (1REG1) is enabled to pass a sub-section "A" discriminating signal by way of the register allotter RA1 to the first selector (1S1) upon which the transmission relay set (TRS10) is terminated. The "A" discriminating signal is effective in conditioning the particular first selector alone to be eventually responsive only to a backward marking potential received at one of its 1SOA outlets. Thus the marking (M) wires of the twelve section "A" outlets alone are suitably directed within selector 1S1, the particular outlets extending over corresponding links ALKS to inlets of second selectors 2SA1 to 2SA10 (sub-section "A").

The register also applies a significant potential to that one of 20 common conductors DA corresponding to the division serving the called subscriber. Thus in the present case, conductor 1DA relevant to division DIV1 is marked. The register moreover energizes three conductors (hundred, ten and unit digits) of the transfer path TPA, significant of the last three digits of the wanted subscriber's directory number. If the 500-line marker is idle, or when it becomes idle, the energized conductor 1DA seizes the marker entry relay set ERS1A. This prevents any of the remaining entry relay sets of the division being seized, operates the related terminating trunk marking relay 1TTMA, and extends the 25-conductor transfer path TPA to the marker.

The terminating trunk marking relay, 1TTMA, now completes the marking (M) wires of the links between ten of the 40 terminating trunks (division DIV1) and ten of the 200 second selector LOA outlets (sub-section "A") of the calling section SECT1.

The energized hundred-digit and ten-digit leads of the transfer path operate relays within the marker which enable the energized unit-digit lead to be extended to the requisite one of the 500-line-marking leads of the marker, and thence by way of the line intermediate distribution frame to the incoming marking (M) lead of the wanted subscriber's line circuit. It may be noted that the unit-digit lead energization is obtained from the section marking control circuit (SMCA in present case) and is to be initially employed in determining whether or not the called subscriber is idle.

When the called subscriber's line circuit is to be marked, the subscriber may be busy or idle, and the marking lead of the circuit would be conditioned accordingly. If the line circuit is busy when marked, the section marking control circuit would respond to a guarding condition present upon the line circuit, to release itself together with the register, entry relay set, terminating trunk marking relay. Thereupon the transmission relay set would be held by the calling subscriber's loop, the relay set retaining the bridge magnets of the primary and secondary selectors, and returning busy tone to the caller.

If the called subscriber's line circuit is idle when marked, the marking potential, extended to the primary line-selector outlet to which the line circuit is connected, exclusively operates the auxiliary and select magnets appropriate to that outlet. However the originating call discriminating relay is not operated, so that the potential applied by the primary selector to the discriminating conductors (D) of the ten links, remains appropriate to a call termination. The marking relay, within the primary selector, is also operated so that a potential is applied to the marking conductors (M) of all of the ten primary/secondary links which are not already in use on established connections, operated bridge magnets signifying busy links.

In each secondary line-selector having but one associated link marked, the appropriate auxiliary magnet is operated. This permits the terminating-call discriminating relay of the selector to operate to the potential received over the discriminating lead of the link, and moreover enables the select magnet appropriate to the link to be operated from the backward marking potential. Others of the eight secondary line-selectors (possibly two) may have two links from the primary line-selector marked. As already mentioned, in these circumstances the selector is adapted to give priority to one of the links, and the auxiliary and select magnet appropriate to the priority link alone are operated.

It is to be noted that the state now obtaining is that the auxiliary and select magnets appropriate to the called subscriber are operated in the particular primary line-selector exclusively, and moreover that an auxiliary and select magnet in each accessible secondary line-selector are also operated.

In each marked secondary line-selector, the operated terminating-call discriminating relay, applies a potential to each idle one of the five inlets of the selector (bridges 1 to 5), the idle inlets being signified by relevant unoperated bridge magnets. Thus the idle ones of the 40 terminating trunks TT1 to TT40 appropriate to the division are marked. Since the terminating trunk marking relay (1TTMA), intermediate the called division and the calling sub-section, is operated, the marking wires (M) of the requisite ten trunks are extended to ten outlets, LOA, of second selectors 2SA1 to 2SA10 (sub-section "A") of section SECT1.

In each of the marked (2SA1 to 2SA10) second selectors of the particular sub-section, a single auxiliary magnet and select magnet appropriate to one marked terminating trunk is operated, and a marking relay is also operated. The latter relay applies a potential to the marking lead M of each idle inlet of the switch, busy inlets again being identified by an operated bridge magnet. It follows that if all ten second selectors of the sub-section have been marked, as many as 100 links ALKS may be marked, by said selectors, and a corresponding number of first-selector outlets 1SOA, would be marked. However in each of those first selectors which receive such a marking or markings, an auxiliary and select magnet appropriate to the marked outlet, or one of them, are exclusively operated. A marking relay in each of these first selectors is also operated, but it is important to note that only one of these relays can become effective, namely that in the first selector (1S1) which is exclusively receiving a discriminating signal indicative of a sub-section "A" call, the signal being applied over the register allotter (RA1) serving the calling transmission relay set (TRS10). The operated relay of the particular first selector applies a marking potential by way of the register allotter to the register. The register thereupon connects earth, by way of the transmission relay set, to the P and H (holding) wires of the relevant inlet (10) of first selector 1S1.

The earth on the H wire operates the bridge magnet corresponding to the inlet, and this magnet in conjunction with the pre-operated auxiliary and select magnets closes crosspoints in the switch which connect the A, B and P wires of the transmission relay set to the effective one of the marked links ALKS. The earth received over the P wire of this link, operates the bridge magnet of the second selector (sub-section "A") terminating the link. In this second selector alone, the operated bridge magnet and the pre-operated auxiliary and select magnets close those crosspoints which now advance said A, B and P conductors to the outlet defined by the latter pair of magnets. These conductors extend to a particular terminating trunk of division DIV1, and now the potential on the P lead operates the corresponding secondary line-selector bridge magnet. This magnet and the operated auxiliary and select magnets now close crosspoints, which advance the A, B and P conductor over an effectively marked link to the primary line-selector serving the called subscriber. Thereupon the appropriate bridge magnet in the primary selector operates, and this together with the operated auxiliary and select magnets defining the called subscriber, now closes crosspoints which advance the A, B and P conductors to the called subscriber's line circuit.

A loop, containing a testing device, applied to the forwardly extended A and B conductors by the register, would now be effective in operating the cut-off relay in the line circuit. The cut-off relay thereupon (*a*) removes the line relay from the line, (*b*) advances the A and B conductors to the cleared line and (*c*) releases all the auxiliary and select magnets which have been used in the present call termination process, whilst also restoring the relevant selector relays to normal. The cut-off relay is retained for the present by the register like the bridge magnets on the called side of the connection.

When the called subscriber's cut-off relay has operated, the testing device in the register releases to initiate the release of the register and the section marking control circuit (SMCA). The entry relay set, marker and terminating trunk marking relay are also released. The register in releasing passes a signal to the transmission relay set and this causes (*a*) the A and B wires at the calling side of the connection to be diverted from the register to the calling speech-battery feeding relay of the transmission relay set, and (*b*) the A and B wires at the called side of the connection to be diverted to a conventional source of ringing current in the relay set.

Thereupon the called party's bell is rung, ringing tone is made audible to the caller, and from this time onwards the two groups of bridge magnets (originating and terminating) together with their respective subscriber's cut-off relays are retained by the transmission relay set.

When the called party duly answers, the ringing current is tripped in the usual manner and a speech-battery feeding relay is introduced at the called side of the transmission relay set. Operation of said relay causes a metering pulse (positive battery) to be applied to the calling-side P conductor, to operate the calling subscriber's meter. The conversational path is now completed.

*Call to subscriber over sub-section "B."*—When the digits, indicative of a local subscriber, have been received by a register, section marking control circuit SMCA or SMCB is taken into use arbitrarily. A call involving section, SECT1, and a called subscriber served by division DIV1 has already been described, in which the use of section marking control circuit SMCA determined that the call was routed over sub-section "A." If, however, control circuit SMCB has been taken into use the call would have been routed over sub-section "B". The switching procedure under the latter circumstances will now be outlined briefly.

The register duly applies a discriminating signal for sub-section "B," by way of the allotter, to the first selector serving the calling transmission relay set, and the effect of this signal is to condition the selector so that eventually it will only be responsive to a backward marking received over one of its 1SOB (sub-section "B") outlets.

In addition the register applies a potential to lead 1DB to define the particular 500-line division DIV1, and also the hundred, ten and unit digit leads in the transfer path TPB appropriate to the last three digits of the called number, are also marked. Four marking conditions are thus applied to the marker entry relay set ERS1B, and if the marker is not in use, the potential applied to lead 1DB enables the transfer-path markings to be operative upon the marker.

The entry relay set also operates terminating trunk marking relay 1TTMB, whereby the marking leads of the links between ten terminating trunks (TT1 to TT40) of division DIV1 and ten second selector outlets LOB of section SECT1 are completed. The latter thereupon exclusively marks the wanted subscriber's line circuit, the marking control circuit SMBC testing for the idle or busy condition during this function.

If the called line circuit is encountered busy the marking control circuit, register, entry relay set and marker would be released, and busy tone would be returned to the caller by the transmission relay set.

Alternatively if the line circuit is idle when marked, the particular primary line-selector and those secondary line-selectors accessible over idle links are responsive as described in respect of the sub-section "A" call. Since relay 1TTMB has been operated in the present case, the the secondary line selectors will mark over the appropriate idle paths into second selector outlets LOB (sub-section "B") of section SECT1, whereupon the second selectors will respond after the manner already described and extend markings over idle links BLKS to first selector outlets 1SOB. If one of the latter markings is received by the first selector serving the calling transmission relay set, this selector alone fully responds in that an auxiliary and select magnet, appropriate to the individual LOB outlet, are operated, and a marking potential is passed to the register by way of the register allotter.

Thereupon the register functions after the manner already described, in that it effects operation of the first selector bridge magnet corresponding to the calling transmission relay set. The setting-up of a through connection to the called party is then effected by the successive operation of a bridge magnet in a second selector (sub-section "B") and a secondary and primary line selector and from this point onwards the procedure follows that previously described.

*First selector fails to receive backward marking.*—It is evident that when a called subscriber's line circuit has been successfully marked, a backward marking may not reach the first selector concerned in the call, within a short pre-determined period. This situation may be brought about by so-called artificial-busying which may be extensive during heavy traffic periods. Under these circumstances the section marking control circuit involved would be released together with the entry relay set, the marker and the terminating trunk relay set, and additionally all the pertinent selectors, in the called division and the sub-section, would be restored. A second attempt would then be made to complete the call over the other sub-section, and if this fails for any reason, busy tone is returned to the caller by the transmission relay set and all the equipment concerned with the attempted call-termination is restored to normal.

*Simultaneous marking and completion of two calls from one section.*—The provision of two marking control circuits SMCA and SMCB in each section, and the provision of two transfer paths, TPA and TPB together with two groups of division-selecting conductors DA and DB enables any section to institute the simultaneous marking of two subscriber's line circuits served by different divisions, if the need arises. However, this can only apply in respect of calls using transmission relay sets served by different first selectors and therefore different register allotters. It is to be noted that each register allotter is arranged to extend a section "A" or section "B" discriminating signal to the allied first selector, but in no case can it apply both signals concurrently.

Both section marking control circuits are employed in respect of simultaneous marking function. The use of circuit SMCA ensures that one register allotter applies a sub-section "A" signal to its first selector, whereas circuit SMCB determines that the other register allotter applies a subsection "B" signal to its first selector. Thus the former first selector is conditioned to be eventually responsive to a backward marking over sub-section "A," whereas the latter first selector is conditioned for response to a backward marking over sub-section "B."

Assume now, in section SECT1, that the register designated for a sub-section "A" call is concerned with a call over division DIV1, and that the register designated, for a sub-section "B" call is concerned with a call over division DIV2. Then the first-mentioned register utilises entry relay set ERS1A and the line marker MKR (both of division DIV1) to mark the relevant called subscriber's line circuit, whereas the latter register would utilise entry relay set 1ERSB and the line marker (both of division DIV2) for the marking function. Entry relay set ERS1A, of division DIV1, operates that terminating trunk relay 1TTMA of the group related to said division and shown in the drawing, whereas entry relay set ERS1B of division DIV2 operates a relay 1TTMB of a group associated with the latter division. The particular 1TTMA relay completes the marking leads of ten links between terminating trunks to division DIV1 and second selector outlets LOA (sub-section "A") of the section, while the particular 1TTMB relay completes the marking leads of ten links between division DIV2 and second selector outlets LOB (sub-section "B") of the same section.

The marking applied to each of the two called subscriber's line circuits, is effective, in the appropriate division, in operating auxiliary and select magnets and performing backward marking functions in the manner already described. The relevant operated terminating trunk relays provide for the extension of markings from division DIV1 into second selectors of sub-section "A," and for the extension of markings from division DIV2 into second selectors of sub-section "B." All the marked second selectors perform their preparatory switching functions, i.e. auxiliary and select magnet operations, and moreover, the marked ones of second selectors 2SA1 to 2SA10 (sub-section "A") institute the marking of first selector outlets 1SOA over idle links ALKS, while the marked ones of selectors 2SB10 (sub-section "B") institute the marking of first selector outlets 1SOB over idle links BLKS. It can be expected that some, if not all, of the first selectors will have both 1SOA and 1SOB outlets marked.

It will be recalled that of all the first selectors of the division, only two have been conditioned by the related register allotters to be responsive to backward markings, one being adapted to respond only to an outlet 1SOA marking and the other to an outlet 1SOB marking. Reception of the respective markings enables the appropriate auxiliary and select magnets of the two first selectors to operate, and thereupon signals are extended to the relevant registers to initiate completion of the respective calls. The setting-up of the two connections to the called parties by the successive operation of bridge magnets in the selecting stages now proceeds in the manner already outlined, and it is obvious that the setting-up of the calls through the different sub-sections, like the backward marking functions, is effected without mutual interference.

*Outgoing junction call.*—When a register has been seized by a caller and exchange code digits appropriate to an outgoing junction call have been stored therein, one of the section marking control circuits SMCA or SMCB is arbitrarily taken into use. Thereupon the sub-section "A" or "B" discriminating signal is applied to the first selector serving the calling transmission relay set, by way of the pertinent register allotter. Moreover the appropriate one of the two junction route discriminators JRDA and JRDB is seized, according to whether sub-section "A" or "B" respectively is to be employed. An appropriate number of exchange code digits is transferred to the particular junction route discriminator and one relay of a plurality of pairs of junction marking relays 1JMA and 1JMB is selectively operated. As already mentioned there is one pair of junction marking relays per section for each outgoing junction route, and each relay of a pair is appropriate to that group of junctions, comprising one half (preferably) of those extending to a particular remote exchange.

The operated junction marking relay completes connection of the marking (M) and testing (T) conductors from the requisite group of outgoing junction relay sets, such as OJRS–1A or OJRS–1B of the required route, to JOA or JOB outlets respectively of second selectors in the calling section. Other conductors, namely A, B and P of the junction relay sets are of course permanently connected to the appropriate second selector outlets. All outgoing junction relays are accessible from all sections, and of the particular group of junction relay sets, those which are idle now extend markings (M conductors) to the relevant JOA or JOB outlets of the second selectors in the calling section. These markings are operative on second selectors 2SA1 to 2SA10 (sub-section "A") or 2SB1 to 2SB10 (sub-section "B") exclusively.

Within a marked second selector, an auxiliary magnet operates to the exclusion of the others, and this enables each of those of the outlets which is marked and also associated with the particular auxiliary magnet, to operate the relevant select magnet.

A testing relay in each marked second selector is thereupon connected simultaneously to the testing (T) wire of all said particular marked outlets of the selector. The relay which is of the non-dual switching type, operates, temporarily guards the relevant junction relay sets, and initiates backward marking of idle links. The order-of-choice arrangements incorporated in each selector are now effective in determining that only one select magnet of those operated in the selector remains operated. Those magnets which are released remove the guarding condition from the T wires of the related junction relay sets.

The situation now is that one auxiliary magnet and select magnet is operated in each marked secondary selector, one junction relay set for each such selector has been selected for possible use, and idle links ALKS or BLKS are marked.

If one or more marked links is terminated upon the calling, and distinctively conditioned ("A" or "B" discrimination) first selector, the auxiliary and select magnets appropriate to the marked link, or one of them, are operated. This first selector then marks the calling register by way of the register allotter. Thereupon a through connection (A, B and P conductors) is established between the register and a particular outgoing junction relay, by the successive operation of bridge magnets in a first and second selector. This results in the seizure and permanent guarding of the junction relay set, and, apart from the bridge magnets maintaining the connection, the selectors are restored to normal. The section marking control circuit, junction route discriminator and junction marking relay are also released.

In the meantime, the register has associated itself with a tariff computer (TC) and a local (LS) or national sender (NS). The tariff computer having received digital information, say the exchange code, from the register responds accordingly to select and transmit a coded tariff signal appropriate to the call to the outgoing junction relay set. The tariff signal, being one of 15 possible signals is actually transmitted over a pair of conductors to the register where they join the A and B conductors extending over the first and second selectors to the junction relay set.

The tariff signal is arranged to selectively operate storage relays in said relay set, and when the called subscriber ultimately answers the operated relays will enable the appropriate metering function to be effected. The tariff computer releases immediately the tariff signal has been transmitted.

Reverting now to the function of the sender (local or national) which has in the meanwhile been associated with the calling register, those of the dialled digits received by the register which are to be transmitted over the seized junction, are effectively transferred to and stored by the sender. After the outgoing junction relay set has responded to the tariff signal as previously described, it returns a "start-sending" signal over the A and B wires to the sender. The nature of the "start-sending" signal would depend on the junction route involved. Thus if the call is to be terminated in the local multi-exchange network, a local sender, arranged say for 10 i.p.s. digit transmission only, would be in service, and the relay set would initiate this type of transmission. However other junction groups extending outside the local network, may require any of the different forms of digital transmission provided by the national senders. Accordingly when a national sender has been taken into service on a call, the outgoing junction relay set would transmit a "start-send" signal appropriate to the specific digit-transmission requirements of the junction.

With further regard to outgoing junction calls, it will be evident that the effective splitting of each section into two sub-sections enables two such calls to be handled by any section simultaneously without mutual interference. It will also be evident that either sub-section could be engaged in the setting up of a call to a subscriber served by the exchange while the other sub-section is handling an outgoing junction call.

If need be, the outgoing junction capacity of the exchange may be increased by the introduction of a stage of third selectors in each of the sections, such third selectors being interposed, in two groups (sections "A" and "B"), between some or all of the junction outlets JOA and JOB and the outgoing junction relay sets. According to the particular requirements, all the junction routes may be accessible over third selector outlets or some may be accessible from third selectors and others from second selectors. In each case junction marking relays would be interposed between the outlets of the particular last selecting stage and the junction relay sets.

*Circuit Details*

The circuits of various equipments, referred to in the foregoing description of the typical exchange embodying the invention, will now be described in some detail.

*First selector.*—The circuit of a first selector for use in a so-called trunking section of the exchange, is represented in FIGS. 6 and 7. The selector uses the triple-group arrangements illustrated in outline in FIG. 1, to provide for switching between ten inlet and 26 outlets, although with the particular first/second selector link requirements of the exchange only 25 outlets are equipped i.e. the 25th or 26th outlet is not connected.

For simplicity only one of the ten bridges of the selector is represented, this being bridge BR1 which is associated with inlet I1. The A, B (speech) and P (private) conductors of the typical inlet are connected to contacts of three crosspoints related, in downward order, to auxiliary select magnets 1AM, 2AM and 3AM respectively. The other inlets I2 to I10 (not shown) would be similarly connected with respect to bridges BR2 to BR10. The H wire of inlet I1 is connected to bridge magnet 1BM, and the corresponding wires of other inlets are similarly related to individual bridge magnets. The ten inlets are accessible from separate transmission relay sets TRS, and the group of ten relay sets is served by a particular register allotter which is connected to the first selector over path RA.

Of the 26 outlets O1 to O26, outlets O1, O2 and O3 are represented in full, in that the four conductors A, B, P and M (marking) are shown, but again for simplicity the M wires only of the remaining outlets are illustrated. The A, B and P conductors of all outlets are multipled over all the ten bridges as was described with reference to FIG. 1, and the relationship of the select magnets 1SM to 9SM and the auxiliary magnets 1AM to 3AM with respect to the outlets O1 to O26 is shown in the following table:

| | 1SM | 2SM | 3SM | 4SM | 5SM | 6SM | 7SM | 8SM | 9SM |
|---|---|---|---|---|---|---|---|---|---|
| 1AM | O1 | O4 | O7 | O10 | O13 | O16 | O19 | O22 | O25 |
| 2AM | O2 | O5 | O8 | O11 | O14 | O17 | O20 | O23 | O26 |
| 3AM | O3 | O6 | O9 | O12 | O15 | O18 | O21 | O24 | ------ |

From the point of view of external trunking, the first selector outlets are divided into two groups viz.:

1SOA—O1, O2, O3, O7, O8 O9, O13, O14, O15, O19, O20, O21 and O25

1SOB—O4, O5, O6, O10, O11, O12, O16, O17, O18, O22, O23, O24 and O26

In the particular telephone exchange, which requires 25 outlets from the first selector, either of outlets O25 or O26 is not terminated, and the 1SOA outlets (12 or 13) extend over links (ALKS) to inlets of sub-section "A" second selectors, whereas the 1SOB outlets extend over links (BLKS) to inlets of sub-section "B" second selectors. This arrangement contributes to the effective division of the section into two sub-sections.

As regards internal switching, each of the two groups of outlets may be considered to be divided into three sets as follows:

| | | | |
|---|---|---|---|
| 1SOA | O1,O7,O13,O19,O25<br>Set A*a* | O2,O8,O14,O20<br>Set A*b* | O3,O9,O15,O21<br>Set A*c* |
| 1SOB | O4,O10,O16,O22<br>Set B*a* | O5,O11,O17,O23,O26<br>Set B*b* | O6,O12,O18,O24<br>B*c* |

The order of the outlet sets and the individual outlets of each group, from left to right, is indicative of the order-of-choice of the sets and their outlets.

It is to be noted that relay G in the selector is permanently operated in the absence of fault conditions. Thus in the idle state of the selector the relay is energized over its upper winding in series with resistor R1, and subsequently when this winding is disconnected, the relay remains operated by way of its lower winding due to earth received over lead GT and extending over contacts G3.

With relay G operated, contacts G1 disconnect the alarm circuit involving lamp LPA, and contacts G2 loop the GA and GB leads of the register allotter access path RA to permit completion of a testing path between the transmission relay sets of the relevant group and a first or second-choice register. When a register has been taken into use, one of the two section marking control circuits SMCA and SMCB duly grants permission for the call to proceed by way of the relevant sub-section "A" or "B" respectively. Thereupon the register applies a discriminating earth signal to lead MA or MB by way of the register allotter, and accordingly relay RA operates in the case of a sub-section "A" call or relay RB operates for a sub-section "B" call.

Considering a sub-section "A" call, with relay RA operated, contacts RA9 prevent possible operation of relay RB, and contacts RA12 prepare a path between lead MA and relay MK. Contacts RA1 to RA5 prepare paths to select magnets 1SM, 3SM, 5SM, 7SM and 9SM in respect of sub-section "A" outlets, i.e. outlet group 1SOA mentioned above. Contacts RA6, RA7 and RA8 perform the important function of connecting the M conductors of sub-section "A" outlets to appropriate auxiliary magnets. Thus contacts RA6 connect the M wires of set A*a* outlets (O1, O7, O13, O19, O25) to magnet 1AM, contacts RA7 connect the M wires of set A*b* outlets (O2, O8, O14, O20) to magnet 2AM and contacts RA8 establish the necessary connections between set A*c* outlets (O3, O9, O15, O21) and auxiliary magnet 3AM. Contacts RA11 prepare holding paths for the auxiliary magnets, whereas contacts RA10 prepare to mark lead MAS of the register allotter.

Alternatively in the case of a sub-section "B" call, the operation of relay RB is effective at contacts RB9 in disabling relay RA. Contacts RB12 prepare to connect relay MK to lead MB of the register allotter access path. Contacts RB1 to RB5 prepare circuits for select magnets 2SM, 4SM, 6SM, 8SM and 9SM in respect of sub-section "B" outlets, i.e. outlet group 1SOB, while contacts RB6, RB7 and RB8 connect the M conductors of set B*a* outlets (O4, O10, O16, O22) set B*b* outlets (O5, O11, O17, O23, O26) and set B*c* outlets (O6, O12, O18, O24) to auxiliary magnets 1AM, 2AM and 3AM respectively. Also with relay RB operated, contacts RB11 prepare holding circuits for the auxiliary magnets, whereas contacts RB10 prepare to mark lead MBS of the register allotter.

It is important to note that the operation of relay RA, due to the appropriate discriminating signal, in exclusively connecting the M wires of outlet sets, A*a*, A*b* and A*c* to auxiliary magnets 1AM, 2AM and 3AM respectively, will determine that the selector can only respond to a marking duly received on an M lead of said outlet sets, i.e. a sub-section "A" call. Likewise the operation of relay RB would determine that the selector could only respond to a marking received on an M lead in the outlet sets, B*a*, B*b* and B*c*, i.e. a sub-section "B" call.

Assume now that the selector is to be used for a sub-section "A" call as evidenced by the operated state of relay RA. The M leads of any number of the sub-section "A" outlets may duly receive backward marking earth from the second selectors of sub-section "A" according to the number of links (ALKS) which are useable in respect to the present call. It follows that (*a*) if any or all of set A*a* outlets are marked, auxiliary magnet 1AM and its attendant relay AR will be energised, (*b*) if any or all of set A*b* outlets are marked, magnet 2AM will be energised and (*c*) if any or all of set A*c* outlets are marked, magnet 3AM will be energised. Any sub-section "B" markings received by the selector at this time are ineffectual because the relevant marking leads are in effect isolated due to the un-operated state of relay RB.

Continuing with the description of a sub-section "A" call, it will be assumed initially that set A*a* (O, O7, O13, O19, O25) duly receives a marking potential (earth) at one or more of its M conductors, to the exclusion of the other outlet sets. Thereupon auxiliary magnet 1AM and relay AR operate, the latter, at contacts AR1, disconnecting a point in the path to magnet 2AM. Of the directly operated contacts of magnet 1AM, contacts 1AM1 complete a holding circuit for the magnet, and contacts 1AM2 disconnect the upper winding of relay G whilst also operating relay MA. Relay G now remains operated over its lower winding from earth applied to lead GT. Contacts MA10 and MA11 disconnect points in the paths to magnets 2AM and 3AM respectively, whereas contacts MA1, MA3, MA5, MA7 and MA9 extend the marking wires of outlets O1, O7, O13, O19 and O25 (set A*a*) to the double-wound select magnets 1SM, 3SM, 5SM, 7SM and 9SM respectively, each select magnet at this juncture, having its windings connected in series by individual contacts of relay MK. Each select magnet which is now appropriate to a marked outlet, therefore proceeds to operate, and the operated ones of select magnet contacts 1SM2, 3SM2, 5SM2, 7SM2, 9SM2 bring about operation of relay MK. It is to be noted that contacts 1SM1 to 9SM1 are connected chainwise from resistor R1 which is to provide a holding-battery condition for one of the operated selected magnets. The arrangement of the chain is such that priority as regards completion of a holding circuit for one select magnet follows the order 1SM, 2SM . . . 9SM.

Assuming, in the present example, that magnet 1SM is operated, then a holding circuit for it is provided by contacts 1SM1, and holding circuits are not provided for any other of magnets 3SM, 5SM, 7SM and 9SM which may have been operated. Alternatively if magnet 1SM were not operated, and one or more of the latter magnets are operated, then the one having the earlier appearance in the chain provides itself with a holding circuit to the exclusion of later appearance magnets.

The operation of any select magnet causes relay MK to operate, and thereupon contacts MK1 to MK9 disconnect the operate paths of all select magnets. If, in the present case, magnet 1SM has been provided with a holding circuit (involving resistor R1) that magnet remains operated and any other select magnets which have been operated are now released. With auxiliary magnet 1AM and select magnet 1SM operated to the exclusion of others, it is effectively determined that outlet O1 shall be used for the call.

Meantime relay MK is also effective, at contacts MK10 in disconnecting an additional path to the upper winding of relay G, at contacts MK11 in providing a self-holding path from earth at lead MAS of the register allotter, and at contacts MK12 in applying an earth marking to lead MA of said allotter whence the marking is extended to the register involved in the call. The register thereupon causes an earth condition to be applied by way of the calling transmission relay set to the H lead of the relevant inlet, which in the present example is inlet I1.

Bridge magnet 1BM is operated by the potential applied to the H lead so that the crosspoints in bridge BR1 relevant to the operated auxiliary (1AM) and select (1SM) magnets are actuated. Accordingly the A, B and P conductors of the calling inlet I1 are extended, through the intermediary of the left-hand group of three bridge commons, to the corresponding conductors of outlet O1 which is terminated upon an inlet of a second selector in sub-section "A." Thereupon an earth potential extended forwardly over the P conductor would operate the requisite bridge magnet in the second selector to bring about the through switching function in that selector. The operation of the latter magnet also disconnects the backward marking wire to busy the first link of the second selector which is now being used. Disconnection of the backward marking wire also releases the operated select magnet 1SM in the first selector.

When the connection has been set-up through the exchange, the backward marking function ceases, and eventually the earth is removed from lead MA of the register allotter access path and so relays RA and MK are released. Relay RA effects the release of auxiliary magnet 1AM and relay AR. Upon the release of magnet 1AM, relay MA releases, and so, with the exception of the bridge magnet and the relevant operated crosspoints, the selector is restored to normal. With the release of relay MA, a circuit is again completed for the upper winding of relay G. Obviously the bridge magnet is maintained henceforth until the call is cleared and, during this period, the selector may be used for the establishment of other connections involving other transmission relay sets and other outlets.

Shortly after the selector has been made available for re-use, as mentioned above, the earth is removed from lead GT to disconnect the lower winding of relay G, which in the absence of fault conditions remains operated over its upper winding. However it will be appreciated that if a select or auxiliary magnet were to remain operated at this juncture due to an electrical or mechanical fault, relay G would release to light the lamp LPA over lead AL extending to a suitable alarm circuit. Also with relay G released, contacts G2 ensure that the selector cannot be taken into use until the fault has been cleared.

Having described the operation of the first selector with reference to a sub-section "A" call in which backward marking was effected only over the outlet set A*a* (O1, O7, O13, O19, O25), the function of the selector with respect to other sub-section "A" markings will now be outlined. After relay RA has been operated, to condition the selector for a sub-section "A" call, it may so happen that the backward marking function is effected with respect to outlet set A*b* (O2, O8, O14, O20) or A*c* (O3, O9, O15, O21) exclusively, so that auxiliary magnet 2AM or 3AM respectively is operated by the marking condition. The particular auxiliary magnet thereupon self-holds, and operates the corresponding relay MB or MC. Relay MB would enable those of select magnets 1SM, 3SM, 5SM and 7SM, appertaining to marked outlets of set A*b* to operate over contacts MB1, MB3, MB5 and MB7, whereas relay MC would enable said select magnets to be controlled from outlet set A*c* by way of contacts MC1, MC3, MC5 and MC7. Relay MB or MC, in operating, also disables the un-operated auxiliary magnets and operates relay MK. The latter applies earth to lead MAS of the register access path and effects the release of all operated select magnets except that having the earliest appearance in the order-of-choice chain. From this point, the selector functions after the manner described, to establish the connection between the calling inlet and the selected outlet.

Still considering the operation of the selector with respect to the setting-up of a sub-section "A" call, it is obvious that backward markings may be received at M conductors of two or three of the outlet sets A*a*, A*b* and A*c* concurrently. Accordingly he auxiliary magnets 1AM, 2AM and 3AM, and their attendant relays MA, MB and MC are arranged to be effective in that order-of-choice.

When concurrent markings are received in outlet sets A*a* and A*b* it is necessary to disable auxiliary magnet 2AM to prevent a state of magnetic balance arising with respect to magnets 1AM and 2AM, which are oppositely effective on a common select bar armature. Thus any marking in set A*a*, besides being extended to magnet 1AM, effects operation of relay AR so that its contacts AR1 immediately disconnect magnet 2AM to permit magnet 1AM to become operative in the circumstances mentioned.

With the chain arrangement of auxiliary magnet contacts 1AM2, 2AM2 and 3AM2 associated with relays MA, MB and MC, relay MA will operate to the exclusion of any other even if a marking has also been received by outlet set A*c* to operate magnet 3AM. Relay MA releases magnet 3AM if it has been so operated, and the setting-up of a connection through the selector then proceeds as though outlet set A*a* only had received a marking.

It will also be seen from the circuit arrangement with respect to the auxiliary magnets and relays MB and MC shows that, if magnets 2AM and 3AM initially operate, without magnet 1AM, consequent upon simultaneous markings in outlet sets A*b* and A*c*, magnet 2AM is given priority as regard retention since relay MB operates exclusively to disconnect the magnet 3AM. Accordingly the call would proceed over the priority outlet of set A*b*.

The operation of the first selector in respect of sub-section "B" calls is substantially the same as described above, the principal difference being that the operation of the discriminating relay RB at contacts RB6, RB7 and RB8 directs the marking conductors of outlet sets B*a* (O4, O10, O16, O22), B*b* (O5, O11, O17, O23, O26) and B*c* (O6, O12, O18, O24) exclusively to auxiliary magnets 1AM, 2AM and 3AM respectively. The function and mutually exclusive mode of control of the latter magnets is identical with that described, and the consequent operation of one of relays MA, MB and MC establishes connection between the M leads of outlet set A*a*, A*b* or A*c* and select magnets 2SM, 4SM, 6SM and 8SM with the addition of magnet 9SM when relay MB is operated. It will be appreciated that the order-of-choice arrangements will again enable the select magnet and auxiliary magnet appropriate to a particular marked sub-section "B" outlet to be in the operated state when the bridge magnet of the calling inlet is duly operated. At that juncture the through-connection is completed and the selector is eventually made available for other calls. As in sub-section "A" calls, the G relay tests for the incidence of certain types of mechanical and electrical faults when its lower winding is disconnected.

*Subscriber's line marker.*—As mentioned with reference to the exchange trunking diagram, the 500-line markers are provided on the basis of one for each division of the exchange. The particular marker MKR, with its associated circuits, represented in FIGS. 8, 9, 10 and 11, is appropriate to division DIV1 and is typical of all the markers of the exchange. Two of the entry relay sets namely ERS1A and ERS1B, which are relevant to sub-section "A" and "B" respectively of section SECT1, are shown in full and are typical of five other pairs of entry relay sets ERS2A and ERS2B . . . ERS6A and ERS6B which appertain to sections SECT2 to SECT6 respectively. The entry relay sets are arranged to be mutually exclusive in operation so that the marker can only be used by one section at any one time. Portions of entry relay sets ERS2A and ERS2B are illustrated to demonstrate the inter-relationship of the various relay sets. The portion of the drawing having the designation TTM shows typical pairs of terminating trunk marking relays, and in practice there would be one pair, associated with the particular marker, for each section of the exchange.

Each entry relay set has 26 access conductors. Of these, 25 conductors constitute the digit-transfer path TPA or TPB extending from the registers of the pertinent section, the transfer paths TPA and TPB being concerned with sub-section "A" and "B" calls respectively. A transfer path comprises five "hundreds digit" leads H1 to H5, 10 "tens digit" leads T1 to T0 and 10 "units digit" leads U1 to U0. It will be appreciated that the pair of transfer paths from a particular section are connected to a corresponding pair of entry relay sets in each 500-line division. Thus the paths TPA and TPB from section SECT1, shown in the drawing, are terminated upon such relay sets as ERS1A and ERS1B respectively in each division. The remaining access conductor of each entry relay set is that which is provided to enable a transfer path TPA or TPB of a section to be extended to the required divisional marker. Taking lead 1DA of relay set ERS1A, for example, this is one of twenty conductors 1DA to 20DA (from all registers of section SECT1) which are individually distributed to corresponding entry relay sets of the twenty divisions. Similar remarks will apply to the conductors 1DA to 20DA of sections SECT2 to SECT6 in relation to entry relay sets ERS2A to ERS6A of each division. The conductors 1DB to 20DB from each section, which are concerned with section "B" calls, are arranged in a similar manner with respect to entry relay sets ERS1B to ERS6B of the twenty divisions.

The marker has 500 marking leads M, numbering 100 to 599, which may be used individually to define a called subscriber's line circuit.

The marker contains two groups of "hundreds digit" responding relays 1HA to 5HA and 1HB to 5HB, each having ten make contacts. The relays of the first group are individually accessible from leads H1 to H5 of the transfer paths TPA from all six sections. Relays 1HB to 5HB are similarly accessible from the "hundreds digit" leads of the transfer paths TPB.

The marger also includes 50 "tens digit" responding relays 10T to 59T which are disposed in ten groups of five and also having ten make contacts each. Two typical groups of these relays 11T to 51T and 10T to 50T are shown. The arrangement of the relays is such that when a "hundreds digit" relay is operated, one "tens digit" relay of each group is presented to a separate one of leads T1 to T0 of the appropriate transfer path TPA or TPB, so that one of the latter relays would be enabled to operate from an earth marking forthcoming on one of the "tens digit" leads.

Each of the "units digit" leads U1 to U0, when advanced by an entry relay set, is arranged to be selectively connected to any one of 50 subscribers' marking leads M by a contact of each of the "tens digit" relays 10T to 59T. The operation of any one of these relays connects the 10 "units digit" leads of a transfer path to ten individual subscribers' marking leads M having the same first and second digits. A condition present upon one only of the "units digit" leads would therefore be extended to a particular M lead to signify the called subscriber.

In the idle state of the marker, relays IDA, 1DB, 2DA and 2DB are un-operated as are the similar relays 3DA, 3DB to 6DA and 6DB of the remaining eight entry relay sets (not shown). Two parallel chains, each involving contacts of all said relays together with a monitoring relay ALA or ALB, are connected to relay MA. Relays MA, ALA and ALB are therefore normally operated and their contacts are represented in this condition.

With relay MA operated, its contacts MA1 to MA12 connect earth individually to relays 1DA, 1DB . . . 6DA and 6DB in the entry relay sets. The marker is therefore made available for use by any section of the exchange for sub-section "A" or "B" calls.

The operation of the marker and allied circuits will now be described with reference to a typical call. It will be assumed that a register in section SECT1 has been granted permission to proceed with a call over sub-section "A," as determined by the seizure of section marking control circuit SMCA of said section. Since the wanted subscriber is served by division DIV1, a battery potential is received over lead 1DA of relay set ERS1A, and consequently relay 1DA operates. Thereupon contacts 1DA4 operate the relief relay 1TA which connects the 25-conductor digit transfer path TPA (SECT1) to the marker. Moreover contacts 1DA1 operate the terminating trunk marking relay 1TTMA, so that its contacts 1TTMA1 to 1TTMA10 connect the marking conductors M of ten of the 40 terminating trunks in division DIV1 to ten second selector outlets LOA (sub-section "A") of the calling section SECT1. Contacts 1DA2 and 1DA3 release relay MA but enable the chain-monitoring relays ALA and ALB to hold in series with relay 1DA which also remains operated when relay MA releases. With relay MA released, the marker is effectively guarded against intrusion from other calls since points are disconnected in the operate paths of all relays such as 1DA, 1DB, 2DA and 2DB.

Meantime in respect to the present call, the last three digits of the called subscriber's number are advanced to the marker by the application of a suitable potential to an appropriate one of each of the three groups of conductors constituting the transfer path TPA. Let us assume that conductors H1, T1 and U1 are marked to signify that subscriber number "111" in the particular 500-line group is wanted. The earth potential received over lead H1 operates relay 1HA, whereupon contacts 1HA1 to 1HA10 connect relays 11T, 12T, 13T . . . 10T to the "tens digit" leads T1 to T0 respectively. Since only one of the latter leads, namely T1, has received earth, relay 11T is operated exclusively, so that its contacts 11T1, 11T2, 11T3 . . . 11T10 connect subscribers' marking (M) leads numbered 111, 112, 113 . . . 110 to "units digit" leads U1, U2, U3 . . . U0 respectively. With lead U1 of the "units digit" leads marked to the exclusion of the others, the marking is extended to the M lead numbered 111, and this, assuming that the subscriber is not already engaged, would be effective, as already described, in the initiation of the backward marking of all idle and available paths from called subscriber into and through the calling sub-section, i.e. "A" of section SECT1. It will be apparent that the operation of terminating trunk marking relay 1TTMA in the present instance, effectively guides the backward markings into the requisite sub-section.

It has already been mentioned that the "units digit" signal applied to a marker is derived by way of the calling register from the section marking control circuit employed. Although this signal is normally earth, a distinctive battery potential might well be used in the case of trunk-offering by an operator. Under these circumstances, it would be arranged that the extension of such a battery potential to the marking lead of a busy subscriber's line circuit would enable the operator to intrude upon the existing conversation, in that the backward marking process would be instituted preparatory to the setting-up of a connection between the transmission relay set employed by the operator and the busy line circuit.

In any event, when the register disconnects itself from the marker, the operated digit relays are released together with relay 1DA. The latter allows the terminating trunk marking relay to release, and re-operates relay MA in series with relays ALA and ALB, whereupon the marker is ready to be taken into use for another call.

In the case of a call again to subscriber "111" but involving subsection "B" of SECT1, a battery potential is received on lead 1DB (ERS1B) and earth is applied to digital leads H1, T1 and U1 of transfer path TPB (SECT1). Relay 1DB is operated, and this operates relays 1TB and 1TTMB, and releases relay MA. The monitoring relays ALA and ALB would now be retained in series with relay 1DB. The operated terminating trunk marking relay 1TTMB at its contacts 1TTMB1 to 1TTMB10 connects ten terminating trunks of the called division DIV1 to ten second selector outlets LOB (sub-section "B") of the calling section SECT1, so that backward marking is duly guided in the required manner. Relay MA, now released, effectively guards the marker against further intrusion, whereas relay 1TB connects the transfer path TPB to the marker. Thereupon relay 1HB is operated to connect relays 11T, 12T . . . 10T to the relevant conductors T1, T2 . . . T0 of the transfer path. Relay 11T operates from the individual "tens digit" marking condition and this enables the subscriber's line marking lead (M) numbered 111 to be marked by the potential received over "units digit" lead U1. If the called subscriber's line is idle the backward marking function would proceed after the manner already described.

Having outlined the operation of the marker with respect to typical calls involving sub-sections "A" and "B" of section SECT1, it will be obvious that calls for the same division but involving other sections would be effective in a somewhat similar manner. In each case an entry relay set appropriate to the defined sub-section would be taken into use, and this results in (*a*) advancing of the relevant transfer path TPA or TPB of the section to the marker (*b*) guarding of the marker against further intrusion and (*c*) operating that terminating trunk relay (2TTMA, 2TTMB . . . 6TTMA, 6TTMB) which will connect terminating trunks of the called division to second selector outlets LOA or LOB of the calling section.

It will be observed that contacts 1DA3, 1DB3, 2DA3, 2DB3 . . . 6DA3 and 6DB3 are arranged in a chain which terminates upon relay ALA, whereas contacts 1DA2, 1DB2, 2DA2, 2DB2 . . . 6DA2 and 6DB2 form another chain terminating upon relay ALB. The chains are arranged to provide duplicate holding circuits for that one of relays 1DA, 1DB and the like which may be operated. Although it may be considered that one such chain is adequate, the two are provided to give an improved factor of safety, in that the failure of either chain, say due to a dirty contact, does not disable the marker in any way, but results in the release of a monitoring relay. The release of relay ALA or ALB would cause the appropriate alarm lamp LPA or LPB to be lit over lead AA or AB extending to a suitable alarm circuit. The attendant would normally be required to clear the fault as quickly as possible in case a fault, however unlikely, should develop in the second chain.

A study of the arrangement of the duplicated chain, with respect to relays 1DA, 1DB and the like, shows that entry relay sets have a particular order-of-priority (ERS6B, ERS6A, ERS5B, ERS5A . . . to ERS1A) when demands for the marker are made simultaneously from several sections. The arrangement ensures that the marker deals with such demands on a one-at-a-time basis.

*Tariff computer.*—A tariff computer, such as that shown in simplified form in FIG. 12, is taken into use by registers employed in the setting-up of outgoing junction calls, and serves to determine the tariff to be charged against the caller. Fifteen different tariffs are catered for, and the particular one is chosen according to the value of code digits extended to the computer by the register. In the particular arrangement of the circuit, three digits are required in the assessment of the tariff, but it will be apparent that it could readily be adapted to assess tariffs for any required number or range of numbers of digits.

The tariff computer incorporates a 10 x 10 crossbar switch (10 select and 10 bridge magnets) and each of the ten bridges BR1 to BR10, of which only the first is illustrated, has ten contacts at each crosspoint. The crosspoints of each bridge reading upwardly are related to select magnets 1SM to 10SM respectively. The 1000 individual contacts in the contact field are connected to separate 3-digit code terminals CT which would be numbered 111 to 000. Thus bridge BR1 is associated with code terminals 111–100 whereas the remaining bridges BR2–BR10 would be associated with similar groups of terminals in which the initial digits (A digits) are "2" to "0" respectively.

Three groups of digit wires ADW (A digits), BDW (B digits) and CDW (C digits) extend from registers to the traffic computer, and one wire in each group would be connected to earth by a register requiring a tariff assessment to be made in respect of a particular junction call. Thus if digit wires ADW1, BDW0 and CDW1 were energized it would be evident that the tariff appropriate to the three-digit code "101" was required.

The wires ADW1 to ADW0 and CDW1 to CWD0 are relevant to paths to bridge magnets 1BM to 10BM and select magnets 1SM to 10SM respectively. The B digit wires BDW1 to BDW0 are connected to bridge commons 1 to 10 respectively in each of the bridges.

The tariff computer also includes fifteen tariff relays 1T to 15T which are connected to individual tariff terminals TF1 to TF15. The three-digit code terminals would be strapped to the tariff terminals according to the tariff requirements. The arrangement is such that when a potential is applied to one of the code terminals, in accordance with the three received digits, the appropriate tariff relay would be operated to effect transmission of a distinctive code-signal to leads AT and BT of the register. It may be mentioned that the latter leads are extended into the calling transmission relay set and thence over the speech conductors of the connection, involving first and second selectors of the exchange section, to the outgoing junction relay set where the tariff information is stored.

Consider now the operation of the switch in the tariff computer in response to the reception of a typical three-digit code indication i.e. "101." The earth potential at wire ADW1 is initially ineffective, a similar potential forthcoming at wire BDW0 is connected to the tenth common in each bridge, whereas the earth potential at wire CDW1 causes select magnet 1SM to operate. Now the directly-operated select magnet contacts 1SM1 to 1SM10 are arranged to control relay CC, so that in the present instance relay CC is operated by the closure of contacts 1SM1. Thereupon contacts CC1 to CC10 complete connections between the A digit wires and bridge magnets 1BM to 10BM. Since wire ADW1 alone has earth standing upon it, magnet 1BM is operated exclusively, and accordingly the switch crosspoint (i.e., the lower one) relevant select magnet 1SM in bridge BR1 is actuated. Consequently the B digit earth marking present upon wire BDW0 and extending over the right-hand bridge common is applied to the code terminal 101 which is strapped to a prescribed one of tariff terminals TF1 to TF15, and consequently the appropriate tariff relay is operated.

Contacts of relays 1T to 15T are arranged to control the connection of coded tariff signals to leads AT and BT by way of rectifier bridges involving supervisory relays AS and BS. Three electrical supply sources, namely negative and positive battery and earthed alternating current are concerned in the transmission of the coded tariff signals. Other contacts of certain of the tariff relays, together with contacts AS1 and BS1 of relays AS and BS, determine that earth will be connected to lead REL each time a code signal is transmitted.

The following table shows the nature of the various coded tariff signals in relationship to the relay operations:

| Tariff | Tariff relay operated | Code Signal | | Supervisory relay(s) operated | |
|---|---|---|---|---|---|
| | | Lead AT | Lead BT | | |
| 1 | 1T | Negative | | AS | |
| 2 | 2T | do | Negative | AS | BS |
| 3 | 3T | do | Positive | AS | BS |
| 4 | 4T | do | A.C | AS | BS |
| 5 | 5T | Positive | | AS | |
| 6 | 6T | do | Negative | AS | BS |
| 7 | 7T | do | Positive | AS | BS |
| 8 | 8T | do | A.C | AS | BS |
| 9 | 9T | A.C | | AS | |
| 10 | 10T | A.C | Negative | AS | BS |
| 11 | 11T | A.C | Positive | AS | BS |
| 12 | 12T | A.C | A.C | AS | BS |
| 13 | 13T | | Negative | | BS |
| 14 | 14T | | Positive | | BS |
| 15 | 15T | | A.C | | BS |

The coded tariff signal for a call would be transmitted over the speech conductors of the already established connection to the outgoing junction relay set, before any digital information is passed forwardly over the junction. In the outgoing junction relay set the signal is operative on a group of decoding and storage relays connected between earth and the incoming speech conductors.

Concurrently with the transmission of a coded signal, the tariff computer applies earth to lead REL of the register, and this would initiate the release of the computer so that it may be used on another call.

*Outgoing junction relay set.*—The typical relay set OJRS, shown in FIG. 13 in abbreviated form, is accessible over path 2SO from second selector outlets JOA or JOB alternatively, of all sections of the exchange. The access path comprises the speech conductors A and B, together with conductors P, M and T which are the private, marking and testing conductors. In the idle state of the relay set, no relays are operated and earth is returned to the M conductor by way of contacts K2.

It will be recalled that when a register has been seized by a caller, and code digits appropriate to an outgoing junction call have been stored in it, one of the section marking control circuits SMCA or SMCB is taken into use and this determines whether the call is to be routed over sub-section "A" or "B." Moreover a corresponding one of two junction route discriminators JRDA and JRDB is seized, and junction route discriminating digits are transferred to it by the register, so that a junction marking relay is operated. The particular marking relay connects the M and T conductors of a group of outgoing junction relay sets of the defined junction route (i.e. half the relay sets of the route) to the relevant second selector outlets JOA or JOB of the calling section, according to whether the call is to be routed over sub-section "A" or "B." Therefore the M (marking) leads of second selector outlets (section "A" or "B") which are connected to idle relay sets of the group are now marked by earth.

A second selector, receiving a single idle marking signal from an outgoing junction relay set, performs the previously described preparatory switching functions (i.e. an auxiliary and select magnet operate) and institutes the backward marking process to the calling transmission relay set. Moreover testing means in the second selector, by connecting an earth condition to the T lead of the junction relay set, temporarily guards the latter against seizure from another section and brings about operation of relay T in the relay set.

If a second selector receives idle marking signals from a plurality of junction relay sets, besides initiating the backward marking process, it performs a selecting function to determine which one of those relay sets is to be further retained for possible use in the ultimate connection. The relay set which is to be so retained, has its T relay operated and is temporarily guarded by the selector against intrusion.

In due course a particular path from the calling transmission relay set (with its attendant register) is forwardly established to one of the prescribed junction relay sets by successive operation of a bridge magnet in the calling first selector and a bridge magnet in the appropriate second selector. The A, B and P conductors are thus advanced from the transmission relay set to the chosen outgoing relay set, and an earth condition now received on the P conductor, brings about operation of relay K. Thereupon a seizing loop involving contacts K1 and T3 and relay L is applied to conductors A and B of the outgoing junction. Consequently relay L operates and then self-holds over contacts L1 independently of relay T. Contacts L2 and L3 now connect a discriminating signal from a suitable source DTD to the incoming conductors, and the nature of the discriminating signal would, on a call involving a national sender, determine the form of digital transmission which is to be employed over the junction.

At this stage the unwanted junction relay sets are again made available for service, and relay T in the particular relay set is released by the second selector so that contacts T4 together with contacts K2 ensure that the relay set remains guarded (absence of earth) against intrusion. Also with relay T released, contacts T1 and T2 divert the incoming A and B conductors from the discriminating signal source DTD to the operate windings of a group of tariff-signal decoding and storage relays W, X, Y and Z. Thus the B conductor is connected over oppositely sensed rectifiers MR1 and MR2 to relays W and X, whereas the A conductor is connected to relays Y and Z over the oppositely sensed rectifiers MR3 and MR4. The operate windings of relays W and Y extend to one winding of relay V, and the similar windings of relays X and Z are connected to the second winding of relay V, both windings of relay V being terminated by earth.

At this juncture, a tariff computer, taken into use for a short period by the calling register, transmits one of the possible fifteen coded tariff signals to the outgoing junction relay set. As mentioned with reference to the tariff computer circuit, the fifteen signals, which are of short duration, are selectively derived from three sources, namely positive and negative (with respect to earth) and earthed alternating current. The nature of each tariff signal and its effect upon the decoding relays is as follows:

| Tariff | Code Signal | | Decoding relays operated | | | |
|---|---|---|---|---|---|---|
| | Lead A | Lead B | | | | |
| 1 | Negative | | | | | Z |
| 2 | do | Negative | | X | | Z |
| 3 | do | Positive | W | | | Z |
| 4 | do | A.C | W | X | | Z |
| 5 | Positive | | | | Y | |
| 6 | do | Negative | | X | Y | |
| 7 | do | Positive | W | | Y | |
| 8 | do | A.C | W | X | Y | |
| 9 | A.C | | | | Y | Z |
| 10 | A.C | Negative | | X | Y | Z |
| 11 | A.C | Positive | W | | Y | Z |
| 12 | A.C | A.C | W | X | Y | Z |
| 13 | | Negative | | X | | |
| 14 | | Positive | W | | | |
| 15 | | A.C | W | X | | |

It will be apparent that the rectifiers MR1, MR2, MR3 and MR4 perform important functions regarding the decoding process. Thus, considering the first two rectifiers in respect of the alternative conditions of conductor B, (1) a positive potential renders rectifiers MR1 and MR2 conducting and non-conducting respectively, (2) a negative potential produces the opposite conditions of the rectifiers, (3) an A.C. potential makes the rectifiers conduct alternately. It follows that the first condition operates relay W, the second operates relay X, and the third operates relays W and X.

When any tariff signal is received, relay V operates together with the significant tariff-signal decoding relays. Earth at contact K3, extending to contacts W1, X1, Y1 and Z1, enables the operated decoding relays to self-hold over their second windings. Contacts V4 utilise the same earth point to effect operation of relay H. Contacts V1 and V2 maintain connection of the incoming A and B wires to the decoding relays for as long as the short-duration tariff signal persists, whereas contacts V3 prevent contacts H1 applying a short circuit to relay L. With relay H operated, contacts H2 and H3 disconnect the original operate paths of the decoding relays, contacts H4 and H5 prepare for through-connection of the A and B conductors, while contacts H6 provide a holding circuit for relay H.

When relay V releases on termination of the tariff signal, contacts V3 short-circuit relay L which releases to disconnect itself from the junction, but meanwhile contacts V1 and V2 complete the through-connection to the junction in readiness for the forward transmission of digital information by the sender.

The condition of the outgoing junction relay set now is that relays K and H together with the appropriate tariff or decoding relays are operated, and this condition will persist until the called subscriber answering signal is eventually received by the transmission relay set involved in the call.

It will be observed in the relay set that a delta arrangement of contacts of the decoding relays is interposed between relay MP and fifteen leads extending to a meter pulse generator MPG. The latter is arranged to deliver earth pulses to the different leads in accordance with the tariff requirements of the telephone system. Thus if so-called variable-time-interval metering is to be employed on junction calls, the various leads would receive pulses at different but, in each case, regularly recurring intervals, for example leads 1, 2, 3 and 4 might receive pulses at 10 second, 30 second, 1 minute and 15 minute interval respectively.

A study of the delta formation of contacts, shows that the meter pulse lead, 1 to 15, corresponding in number to that of the received coded tariff signal, will be advanced to contacts MS2 in the path to the pulse repeating relay MP.

When the called party eventually answers, the transmission relay set, in responding to the supervisory signal would be arranged to return an initial metering pulse to the calling subscriber meter, and in addition to transmit a positive battery pulse over the forwardly extending P conductor. The pulse enables relay MS in the junction relay set to operate over the isolating rectifier MR5, without relay K and the various bridge magnets being released. Relay MS holds from earth over contacts K4 and MS1, and at contacts MS2 completes the pulse path to relay MP. The latter relay is pulse-operated by the selected pulse source, at regular intervals throughout the conversation, and its contacts MP1 extend pulses of "full" earth to the incoming P lead. In the transmission relay set, earth applied by way of the low resistance coil of a relay to the forwardly extending P conductor, it is at present providing the holding condition for the connection. The effect of each pulse applied to the P conductor by contacts MP1, is to short-circuit and so release the last-mentioned relay which thereupon causes a meter pulse to be transmitted to the calling subscriber's meter.

It may be mentioned that if it is so required, the effect of the first operation of relay MP in respect of metering could be absorbed by utilising another of its contact units to control a pulse-absorbing element. This element would be arranged, after responding to the initial operation and release of relay MP, to close additional contacts represented by an "X" in the path to the P conductor, so that ensuing pulses generated by relay MP would be effective in metering.

It will be apparent that the outgoing junction relay set could readily be elaborated to provide any additional conventional metering requirements and could, if required, be adapted for variable pulse/regular interval metering i.e. multi-metering at say 3 minute intervals.

I claim:

1. In an automatic telephone exchange, a crossbar switch selector having a plurality of bridges, a first group of select magnets, a second group of select magnets, a plurality of bridge magnets, a plurality of multi-conductor inlets, one for each bridge, each inlet being multipled to crosspoints individually controlled by said first group of select magnets, a plurality of multi-conductor outlets divided into two groups, each outlet having a marking conductor and a plurality of conductors multipled to corresponding crosspoints of all the bridges, the multipled crosspoints serving at least two outlets, two discriminating relays, one for each group of outlets, means responsive when an inlet of the selector is taken into use for operating one only of said discriminating relays, means responsive to the operation of said one discriminating relay for extending the marking conductors of the outlets relevant to said one discriminating relay to said first group of select magnets, and for operating one of said first group of select magnets in a mutually exclusive manner in response to the application of marking potentials to any of the said outlets relevant to said one discriminating relay, a switching device associated with each magnet of said first group of select magnets and operated when the associated select magnet is operated and means responsive to the operation of any one switching device for extending the marking conductors of the outlets relevant to said one discriminating relay and relevant to the operated switching device to the appropriate magnets of said second set of select magnets and for operating in a mutually exclusive manner one select magnet of said second group of select magnets relevant to one of said last mentioned outlets whereby the operation of the bridge magnet relevant to said one inlet serves to connect said one inlet to said one outlet.

2. A crossbar switch selector as claimed in claim 1 and comprising in addition contacts for said first group of select magnets operated when said select magnets of the first group are operated, said contacts when operated operating said switching devices and being arranged in a lock-out circuit whereby one switching device only remains operated and contacts for each said switching device which when operated disconnect the select magnets of the first group corresponding to the other switching devices whereby only one select magnet of the first group remains operated.

3. A crossbar switch selector as claimed in claim 2 and comprising in addition contacts for said second group of select magnets operated when said select magnets of the second group are operated, said contacts being arranged in a lock-out circuit whereby one select magnet only of the second group remains operated.

4. An automatic telephone exchange comprising a plurality of groups of subscribers' line circuits, a plurality of originating trunks, a plurality of terminating trunks, a plurality of line selector divisions each including link-connected primary and secondary crossbar switches having a group of subscribers' line circuits individually connected to outlets of the primary switches and having originating and terminating trunks individually connected to inlets of the secondary switches, a plurality of speech path relay sets, a plurality of registers, said speech path relay sets being accessible to said originating trunks and having access to at least one register, at least one trunk section located between originating and terminating trunks of all said line selector divisions and including a plurality of first and second crossbar selectors, first links connecting a first group of outlets of said first selectors to the inlets of a first group of second selectors to form a first trunk sub-section, second links connecting a second group of outlets of said first selectors to the inlets of a second group of second selectors to form a second trunk sub-section, the outlets of said first and second group of second selectors providing routes to terminating trunks of all line selector divisions, a plurality of switching devices for each line selector division, one switching device for each sub-section of a trunk section, a marker for each line selector division, means responsive to a subscriber in one of said divisions initiating a connectoin for extending said subscriber's line circuit over primary and secondary crossbar switches of said one division and an originating trunk to an available speech path relay set and for associating an available register with said speech path relay set, means responsive to the taking into use of said register for marking the first selector to which said speech path relay set is connected, means effective on the reception by said register of dialled digits representing the called line for determining over which sub-section of the trunk section the connection is to be completed and for taking into use the marker of the division which includes the called subscriber's line circuit, means responsive to the taking into use of said marker for operating the switching device relevant to the line selector division which includes the called line and the selected trunk sub-section and means within the marker responsive to the transfer thereto of information designating the called line from said register for applying a marking potential to said called subscriber's line circuit, said marking potential being extended backwardly through the primary and secondary crossbar switches of the line selector division which includes the called subscriber's line circuit to available ones of the terminating trunks of that division and thence over routes which include contacts of the operated switching device and outlets of second selectors of the selected sub-section to said marked one of the first selectors to enable the connection to be completed by the operation of the relevant primary and secondary selectors of the selected sub-section and the secondary and primary switches of the line selector division which includes the called line.

5. An automatic telephone exchange as claimed in claim 4 and comprising in addition two section marking control circuits one for each trunk sub-section and means responsive to the taking into use of a register for associating one of said section marking control circuits with said register, thereby determining over which trunk sub-section the connection is to be completed.

6. An automatic telephone exchange as claimed in claim 4 and comprising in addition a plurality of pairs of entry relay sets for each marker, one pair of entry relay sets for each trunk sub-section and means responsive to the reception of dialled digits by the register for taking into use one of a particular pair of entry relay sets as determined by the trunk section and trunk sub-section over which the connection is to be completed.

References Cited in the file of this patent

UNITED STATES PATENTS

| | | |
|---|---|---|
| 2,761,012 | Murray et al. | Aug. 28, 1956 |
| 2,816,173 | Dietsch | Dec. 10, 1957 |
| 2,822,431 | Kruithof et al. | Feb. 4, 1958 |
| 2,826,640 | Williford | Mar. 11, 1958 |
| 2,911,477 | Gohorel et al. | Nov. 3, 1959 |
| 2,913,534 | Henquet et al. | Nov. 17, 1959 |